United States Patent [19]
Cunningham et al.

[11] Patent Number: 6,049,557
[45] Date of Patent: Apr. 11, 2000

[54] HIGH POWER PHOTOLYTIC IODINE LASER

[76] Inventors: Philip R. Cunningham, 5 Falcon Ct., Edgewood, N.Mex. 87015; Robert D. Rathge, 9105 Lagrina De Oro, NE, Albuquerque, N.Mex. 87111; LaVerne A. Schlie, 7503 Lamplighter Lane, NE, Albuquerque, N.Mex. 87109

[21] Appl. No.: 09/092,844

[22] Filed: Jun. 5, 1998

Related U.S. Application Data

[63] Continuation-in-part of application No. 08/948,753, Oct. 10, 1997, Pat. No. 5,889,807, which is a continuation-in-part of application No. 08/651,471, May 22, 1996, Pat. No. 5,802,093.

[51] Int. Cl.[7] ............................. H01S 3/22; H01S 3/223
[52] U.S. Cl. ................................................. 372/59
[58] Field of Search ........................................ 372/55, 59

[56] References Cited

U.S. PATENT DOCUMENTS 5,260,961  11/1993  Zhou et al. ................................ 372/59
5,425,044   6/1995  Schlie et al. ............................. 372/55

*Primary Examiner*—Rodney Bovernick
*Assistant Examiner*—Robert E. Wise
*Attorney, Agent, or Firm*—McCormick, Paulding & Huber LLP

[57] ABSTRACT

A continuous wave photolytic iodine laser has a gain cell for receiving a continuous supply of gaseous fuel. The gain cell is connected to laser beam transfer optics, a laser resonator for shaping a laser beam, and a lamp. The lamp is driven by a microwave subsystem such that a laser gain medium is pumped through the gain cell. The continuous wave photolytic iodine laser of the present invention incorporates a closed loop fuel system for presenting gaseous fuel to the gain cell at a rate sufficient to sweep any lasing by-products out of the gain cell, thereby preventing quenching of the lasing process. The fuel system also includes a condenser for converting the gaseous fuel to a liquid after it has passed through the gain cell, a scrubber for removing the by-products of the lasing process from the fuel, and an evaporator for converting the recycled liquefied fuel back to a gas. The closed loop fuel system also includes a pump for pressurizing and transporting the liquefied fuel. Provision of pulsed, high energy ultra-violet radiation to the interior gain modules provides a pulsed photolytic iodine laser with a plurality of gain modules, generating very high energy/high power laser output radiation pulses. These output pulses from a laser with a plurality of gain cells can be a frequency greater than 1 Hz.

28 Claims, 25 Drawing Sheets

C3F7I vapor pressure curve

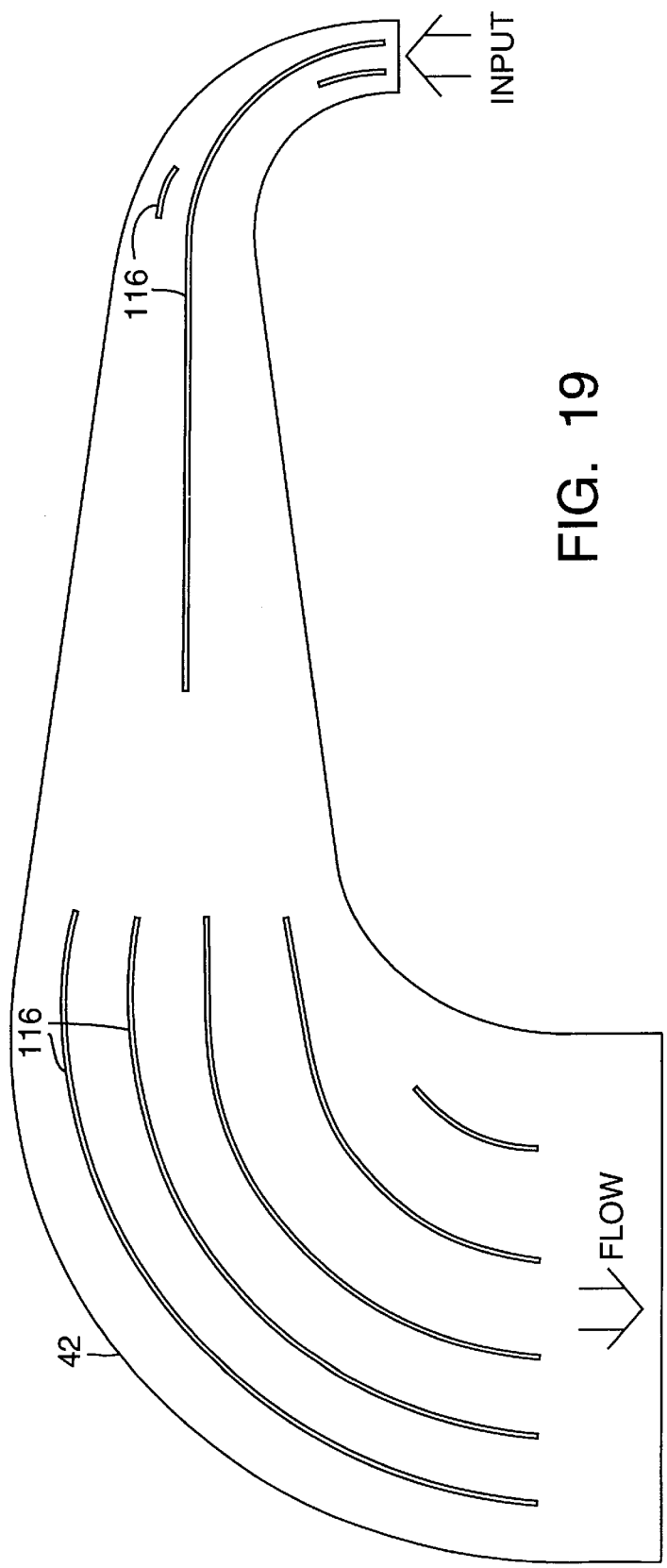

HIGH POWER PHOTOLYTIC IODINE LASER

This is a continuation-in-part of application Ser. No. 08/948,753 filed on Oct. 10, 1997 now U.S. Pat. No. 5,889,807 which is a continuation-in-part of application Ser. No. 08/651,471 filed on May 22, 1996, now U.S. Pat. No. 5,802,093.

This is a continuation-in-part of application Ser. No. 08/948,753 filed on Oct. 10, 1997 now U.S. Pat. No. 5,889,807 which in turn is a continuation-in-part of application Ser. No. 08/651,471 filed on May 5 22, 1996 U.S. Pat. No. 5,802,093. This invention was made with Government support under contracts F29601-94-C-0073, F29601-95-C-0042 and F29601-C-0043 awarded by the Department of the Air Force.

FIELD OF THE INVENTION

This invention relates to the field of Lasers and in particular to continuous wave photolytic iodine lasers.

BACKGROUND OF THE INVENTION

The present invention has particular utility in connection with the industrial, military, and scientific application of lasers and is described herein as applied to such use. In recent years, lasers have been enjoying an ever increasing range of applicability to various processes. The word "laser" is an acronym for "light amplification by stimulated emission of radiation." Therefore, a laser is basically a device for the generation of coherent, nearly single wavelength and frequency, highly directional electromagnetic radiation.

Currently, the gas $CO_2$ (carbon dioxide), and the solid state Nd:YAG (Yttrium, Aluminum, Garnet) lasers dominate the material cutting and welding industries. However, the applicability of these lasers in a wide variety of manufacturing processes is limited. The gas $CO_2$ laser, because of the beam's long wavelength, and the Nd:YAG laser because of its low brightness, both require a great deal of power to be useful. Brightness, also called the beam quality compares the relative amount of energy within the central lobe of a laser beam with that of a perfect laser beam. The numbers corresponding to brightness are greater than or equal to unity, with values of 1 indicating superior brightness and values much greater than 2 or 3 indicating poor performance.

Due to its high brightness and small wavelength, the photolytic iodine laser (PIL) has the potential to address the needs of a wide variety of markets. The PIL is a gas laser which employs a gas as a fuel for generating the laser beam. Usable PILs were first developed in the early 1980's. However, these early PILs were not suitable for manufacturing processes. They displayed poor output power as compared to input power, as well as poor repeatability of performance. Additionally, these early systems were prone to excessive buildup of molecular iodine which severely interrupted the lasing process.

PILs require a continuous flow of fuel through the laser's gain cell region in order to generate a laser beam. The laser's gain cell is that section of the laser where light amplification occurs. For a given gain cell size, the laser's power is proportional to the flow rate of the gaseous fuel through the gain cell. Conventional PILs have employed blowers in the fuel delivery system to provide adequate fuel flow rates. However, these blowers can be costly. In addition, it has been found that merely increasing the pressure in the system is not sufficient. The types of fuel employed in PILs, namely $C_3F_7I$, exhibit high frictional properties which basically cause the fuel to "stick" to the walls of the conduits within which the fuel flows. This results in significant pressure drops in the fuel system thereby making it difficult to establish and maintain fuel flow rates sufficient to generate a laser beam of proper intensity.

PILs employ microwave systems to provide power to the lamps needed to generate a laser beam. In the past, these systems utilized low power magnetrons as the power source. Therefore, these systems required large numbers of magnetrons; one for each lamp, and extensive supporting systems, to provide for adequate laser power. The microwave systems were very complex and required a great deal of maintenance. This made these lasers impractical for industrial use.

Therefore, it is important to provide a PIL whereby the components are kept simple, and the number of components is kept to a minimum. This will allow for ease of maintenance, as well as make the laser more competitive with conventional material processing equipment.

In view of the foregoing, there is a current need and large market potential for an economical materials processing laser which is superior in both brightness, and processing performance to those currently in use. Moreover, the laser must be capable of maintaining its performance integrity over extended periods of time.

Therefore, the general object of the present invention is to provide a continuous wave laser for use in industrial applications which can be economically procured and operated, yet is capable of generating a laser beam of sufficient power so as to be practical.

It is a further object of the present invention to provide a CW PIL which does not require the use of expensive blowers to maintain the fuel flow rate.

It is yet another object of the present invention to provide a PIL wherein the microwave system is capable of powering more than one lamp on a single magnetron.

It is still a further object of the present invention to provide a pulsed PIL possessing sufficient power, energy/pulse and beam quality to be useful in the removal of space debris from low earth orbit.

SUMMARY OF THE INVENTION

The present invention meets these and other objects by providing a continuous wave photolytic iodine laser (CW PIL) which employs a gain cell for receiving a continuous supply of gaseous fuel. The gain cell has an optical axis and a lamp positioned along the axis. Additionally, the gain cell includes beam transfer optics, a gain cell inlet and outlet, and a laser resonator for shaping a laser beam. A microwave subsystem is also provided, and is in communication with the gain cell for driving the lamp such that a laser gain medium is pumped through the gain cell. The CW PIL incorporates a closed loop fuel system for supplying a continuous flow of gaseous fuel to the gain cell. The fuel system has a fuel inlet member in communication with the gain cell inlet for receiving and presenting the gaseous fuel to the gain cell, a condenser is in communication with the gain cell exit for converting the gaseous fuel into a liquid, a scrubber is provided for removing molecular iodine ($I_2$) and any by-products of the lasing operation from the liquefied fuel thereby purifying and preparing the fuel for recycling back to the gain cell. A pump is interposed between the condenser and the scrubber to transport and pressurize the liquefied fuel. An evaporator is in communication with the scrubber for receiving and converting the purified liquid fuel to a gas, thereby causing an increase in the closed loop fuel system's pressure which forces the gaseous fuel through the gain cell at a flow rate whereby substantially all of the molecular iodine and any lasing by-products are swept out of the fuel cell.

According to another aspect of the present invention, the photolytic iodine laser includes a fuel control system having a controller for regulating the flow of the gaseous fuel through the laser. The fuel control system includes a means for generating concentration signals corresponding to a rate of change in concentration of excited iodine (I*) in the fuel in accordance with, $$\int_{t1}^{t2} dI^* = \int_{t1}^{t2} 2\sigma_{pump} F_{uv}(RI) dt - \int_{t1}^{t2} 2k_1 +$$

$$(I^*)(I_2) dt - \int_{t1}^{t2} 2\sigma_{se} F_{IR}(I^*) dt - \int_{t1}^{t2} k_8(I^*)(RI) dt$$

as well as a means for receiving these concentration signals and then generating molecular iodine concentration signals for adjusting the rate by which the concentration of molecular iodine ($I_2$) in the gaseous fuel changes as the fuel passes through the closed loop fuel system. The molecular iodine concentration signals are based on a three body deactivation reaction governed by, $$\left(\frac{\partial I^*}{\partial t}\right) = k_{13}(I^*)(I)(I_2),$$

and $$\int_{t1}^{t2} dI_2 = \int_{t1}^{t2} k_{12}(I^*)(RI) dt.$$

Once the molecular iodine concentration signals have been received, correction signals are generated to adjust the molecular iodine ($I_2$) concentration for a linear fuel flow velocity due to a resultant decrease in the concentration of steady state ($I_2$), as governed by, $$(I_2)_{corrected} = (I_2) - \frac{I_2(1 \text{ cm})_{gain\ cell}}{\text{Flow Rate (cm/s)}} \Delta t.$$

The correction signals are next processed and gain signals for controlling the small signal gain of the laser due to a population inversion of the excited state atomic iodine (I*) to a ground state (I) as established by, $$\alpha = \frac{\left(N_2 - \frac{g_u}{g_l} N_1\right) \lambda^2 \eta g(v)}{8\pi n^2 t_{spont}},$$

where $\eta = \frac{\varepsilon}{\varepsilon_0}$, $t_{spont} = \frac{1}{A_{spont}}$, and $\frac{g_u}{g_l} = 0.5$, are generated. The gain signals are then received and based on their values, intensity signals corresponding to the circulating intensity of the resonator are generated, thereby controlling the magnitude of the infrared flux necessary for regulation of the stimulated emissions from the laser. These intensity signals are best understood by referring to, $$I_{out} = \frac{I_{sat}}{\left(1 + \frac{r1}{r2}\right)(1 - r1r2)} \left[2\alpha_{mo} L - \ln\frac{1}{r1r2}\right]$$

where $r_1$ and $r_2$ are the e field reflectivities, and $R_1$ and $R_2$ are the $\epsilon^2$, or power reflectivities, $\alpha_{mo}$ is the small signal gain, L is the single pass length of the gain, and $I_{sat}$ is the saturation intensity of the laser where, $$R_1 = r_1^2$$

in delta notation, the transmission and reflectivities are related by, $$R_1 = 1 - \delta_1 = T_1$$

and $$R_2 = 1 - \delta_2 = T_2,$$

the total loss of the resonator is represented by $\delta_c = \delta_0 + \delta_1 + \delta_2$ where the linear gas absorption loss, $\delta_0$, is assumed to be zero.

Once the intensity signals have been received, mirror loss correction signals that compensate for losses associated with the mirrors in the resonator optics are generated. The mirror loss correction signals are evidenced by, $$\delta_c = \ln\frac{1}{R_i} = 2\ln\frac{1}{r_i} \approx \ln\frac{1}{R_1 R_2} \text{ or,}$$

$$\delta_c = 2\alpha_0 p + \ln\frac{1}{R_1 R_2} \approx \ln\frac{1}{R_1 R_2}.$$

Upon receipt of the mirror loss signals loaded gain control signals for controlling the loaded gain, $\alpha_m$, resulting from a homogeneous broadening in accordance with, $$\alpha_m = \alpha_{m0} + \frac{1}{1 + \frac{1}{I_{sat}}},$$

where $a_m$ is the gain per cm and pm is the single pass gain length, are generated.

According to still another aspect of the present invention, a heat transfer control system for regulating the rate of heat transfer from and to the gaseous fuel is provided. The heat transfer control system includes a means for generating heat transfer signals corresponding to a rate at which heat is transferred through the tubing walls of heat exchangers. These heat transfer control signals are characterized by, $$\dot{Q} = UA\Delta T_m.$$

Once the heat transfer signals are received, phase change signals determined by sensing the rate at which the fuel passes through and changes phase in the condenser can be generated. These phase change signals are governed by, $$\dot{Q} = \dot{m} h_{vap};$$

where h=enthalpy. Next, the phase change signals are received by the system and evaporation rate signals for controlling the rate at which heat is transferred to the fuel as it passes through the evaporator, thereby converting it from a liquid, back into a gas, are generated. This rate is evidenced by, $$\dot{Q} = \dot{m}\Delta h.$$

To fully regulate the flow of fuel through the laser's closed-loop fuel system, major loss compensation signals must be generated to account for any major losses due to friction in the pipes and conduits in the system. These major losses can be characterized by, $$h_{loss} = f\left(\frac{L}{D}\right)\frac{V^2}{2g} \quad \text{(head loss)};$$

where the friction f is given by, $$f = \left[1.14 - 2\log\left(\frac{\varepsilon}{D} + \frac{21.25}{Re^{0.9}}\right)\right]^{-2}$$

($\varepsilon$ = the pipe's surface roughness);

In addition to the major losses, minor losses must also be accounted for. Therefore, minor loss signals are generates as characterized by, $$h_{loss} = K\frac{V^2}{2g}; \text{ and}$$

The major and minor loss signals are combined such that pump control signals can be generated to control the amount of work done by a pump on the fuel, and to optimize the pump efficiency as determined by;

$$-\frac{dW_{shaft}}{dt} = \rho Q[U_{out}V_{tout} - U_{in}V_{tin}]; \text{ and}$$

$$\left[\frac{p_2}{\gamma} + \frac{V_2^2}{2g} + Z_2\right] = \frac{e_{pump}}{g}\left[\vec{U}_2 \cdot \vec{V}_2 - \vec{U}_1 \cdot \vec{V}_1\right] + \left[\frac{p_1}{\gamma} + \frac{V_1^2}{2g} + Z_1\right].$$

In an alternate embodiment, an elongated rectangular gain cell is incorporated into a CW PIL provided by the present invention.

In another embodiment of the present invention, a first heat exchanger is interposed between the gain cell exit and the condenser for pre-cooling the fuel, and a second heat exchanger is interposed between the evaporator and the fuel inlet member to pre-heat the gaseous fuel as it comes out of the evaporator.

In yet another embodiment of the present invention, a cross flow heat exchanger replaces the first and second heat exchangers.

BRIEF DESCRIPTION OF THE DRAWINGS

These and other features, aspects, and advantages of the present invention will become better understood with regard to the following description, appended claims, and accompanying drawings where:

FIG. 19 is a simplified schematic of an alternative embodiment of the feed inlet of the laser of FIG. 1.

DETAILED DESCRIPTION OF THE INVENTION

Figure 1:
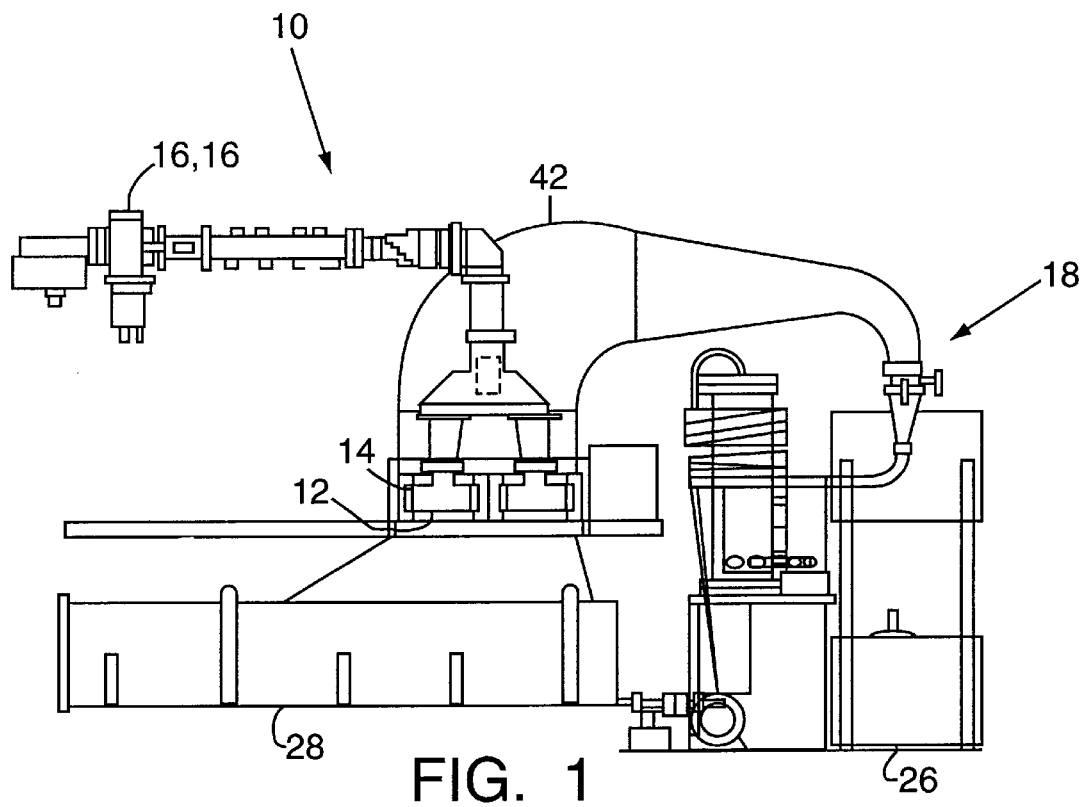
FIG. 1 is a schematic illustration of a CW PIL as provided by the present invention.

Turning to the drawings and first referring to FIG. 1, the preferred embodiment of a continuous wave photolytic iodine laser, there shown and generally designated as 10, comprises a gain cell 12, an optical system 14 in communication with the gain cell, a pair of microwave subsystems 16, 17(only 16 is shown), and a closed loop fuel system 18 also in communication with the gain cell.

Below is a list of terms and their definitions as used herein.

$I$ = Intensity
$\sigma^{se}$ = Stimulated Emissioner Cross Section
$\Delta X$ = Distance in cm
$RI$ = Species (RI) concentration
$\lambda$ = Wavelength
$A_{spont}$ = Einstein Coefficient
$g_u$ = Degeneracy of state "u"
$g_{tu}$ = Degeneracy of state "tu"
$\Delta v$ = Frequency Bandwidth
$V_{(\omega, a)}$ = Voight Profile
$\Delta V_D$ = Doppler Frequency Bandwith
$\tau_{spont}$ = Spontaneous Lifetime
$\omega$ = Frequency
$c$ = speed of light
$HF$ = Hydrogen Fluoride
$DF$ = Deuterium Fluoride
$COIL$ = Chemical Oxygen Iodine Laser
$\Delta V_H$ = Homogeneous Linewidth
$F_{uv}$ = UV Flux
$k$ = Rate Constant
$\sigma_{pump}$ = Pump Cross Section
$I^*$ = different species of Iodine
$_m$ = small signal gain
$P_m$ = single pass gain length
$\epsilon$ = Dielectric Constant
$g_1$ = Degenerate State of 1
$I_{SAT}$ = Saturation Intensity
$L$ = Gain Length
$r$ = reflectivity
$R_1$ = Power Reflectivity
$\delta$ = Gass Absortion Loss
$\delta c$ = Total Transmission Loss
$T$ = Power Transmission
$N$ = Concentration of Atoms/cc
$F_{IR}$ = Infrared Flux
$CO_2$ = Carbon Dioxide
$CW\ PIL$ = Continuous Wave Photolytic Iodine Laser Processes as provided by the present invention are used effectively as models comprised of algorithms executed on computational apparatus of known type to establish laser parameters. In a first process, a kinetics model establishes laser operating parameters such as, pressure, fuel flow rate, and gain cell transverse dimensions. In a second process, a heating ventilation and air conditioning (HVAC) model establishes and optimizes the fuel system's hardware requirements and configuration. The parameters specified when using the kinetics model are flow tubing diameters, numbers and locations of valves, dimensional properties of heat exchangers, condensers and evaporators, and features such as diffusers, plenums, elbows, and transitions to other sizes and shapes. The HVAC model establishes critical design parameters used to create a low friction fuel flow system for the CW PIL of the present invention. The thermal capacity requirements of the ancillary support equipment needed to operate the CW PIL of the present invention are established using results from the kinetics model.

When designing a laser, the dimensions of the transverse gain, the operating pressure, and the fuel flow rate needed to achieve a desired cell output power must be considered. Establishing these parameters provides for the determination of, the mass flow rate of the fuel through the gain region for a given flow velocity. The power output of the laser of the present invention is proportional to the mass flow rate of the fuel through the laser.

The mass flow rate of the fuel determines the required size for the condenser used to convert gaseous fuel exiting the gain cell to a liquid. The mass flow rate of the fuel also determines the size of evaporator, used to convert the liquefied fuel back to a gas, the heat exchangers, and the attendant flow hardware. The size and capacity of the condensers, evaporators, and heat exchangers in turn, determine the size of the low temperature coolers required to control the fuel temperature for the laser fuel system.

Figure 2:
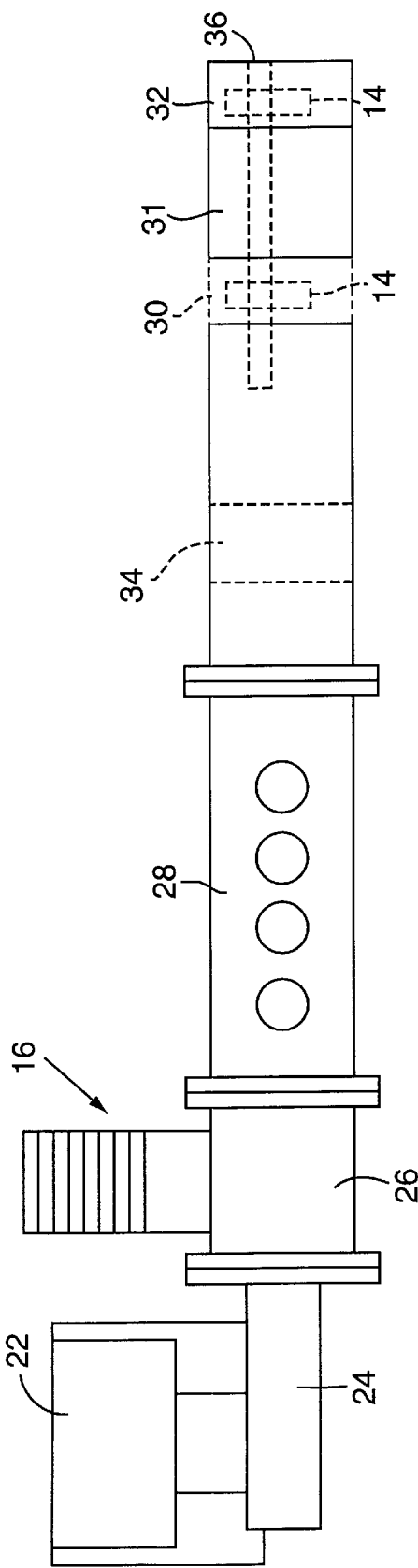
FIG. 2 is a simplified schematic illustration of the microwave subsystem of the CW PIL of FIG. 1.
Figure 3:
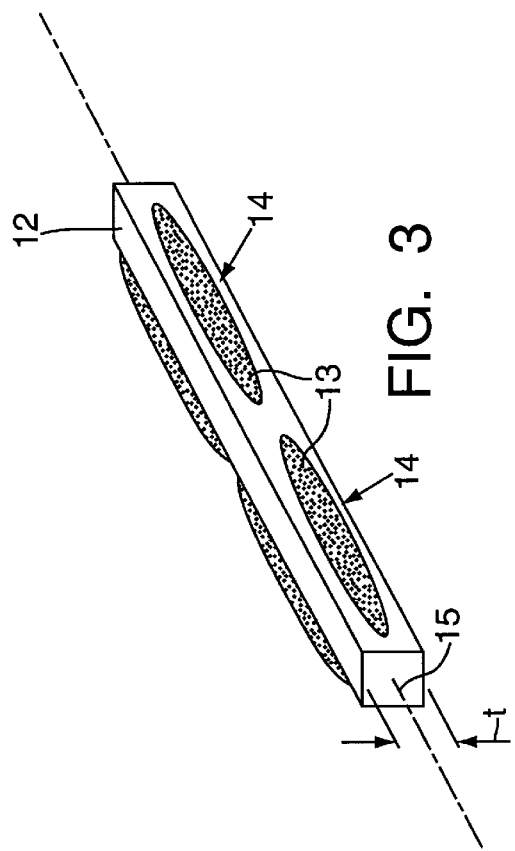
FIG. 3 is a simplified schematic illustration of the gain cell of the CW PIL of FIG. 1.

A critical parameter in the CW PIL of the present invention is the transverse dimension of the laser gain cell 12. The gain cell 12 is best seen in FIGS. 2 and 3. The transverse dimension "t" in FIG. 3 of the laser gain cell 12 is one of the determining factors with regard to defining the microwave pumping subsystem 16 design. Whether the gain cell transverse dimension "t" is 1 ½, 3, or 6 inches in height effects the shape and structure of the UV lamps 14 and the reflectors 20 used in the laser. Additionally the transverse dimension "t" governs the number of lamps 14 and their placement. The microwave pumping of the UV plasma lamps of the present invention can best be accomplished at a frequency of 2450 MHz or 915 MHz. However, the invention should not be limited to this regard as it is also possible to operate at other frequencies.

Based on the foregoing, it can readily be seen that optimization of the design of the laser of the present invention via computer modeling and simulation, prior to building a prototype is provides a cost effective and efficient means for determining the laser's parameters. As such, a process is provided by the present invention whereby an integrated PIL model (Kinetics model) based on solving a series of equations using excited iodine (I*) and molecular iodine ($I_2$), and determining a value for signal gain defines the laser system's configuration. A Rigrod resonator is simulated in the kinetics model to calculate the circulating infrared (1.3 $\mu$) intensity in the system. The kinetics model also estimates the out-coupled intensity or power. A finite difference method is used by the kinetics model to solve the series of equations. By using a steady-state approximation for free radical iodine (I) and $C_3F_7$, denoted hereafter as species (R), the differential equations being modeled were accommodated.

The process employed by the kinetics model provides parameters used in continuous wave (CW) lasers. In addition, the kinetics model of the present invention can study cases of Q-switching, modulation, or other means of varying the laser's duty cycle. This modified kinetics model initially simulates gain pumping without a resonator or circulating infrared flux; once the resonator is simulated, the kinetics model is the same as that for the CW laser with the exception of having accumulated concentrations of I*, $I_2$, R, and R2.

The kinetics model predicts the behavior of a laser having a gain cell that is 25.4 cm long with a transverse cross sectional area of 1 $cm^2$. To predict larger transverse dimensions, multiple 1 $cm^2$ vertical sections can be modeled and simulated. The results are then combined or superimposed, and the behavior of lasers having 1–3 in. high transverse gain cell dimensions was determined. Similarly, additional downstream gain cells can be modeled when the increased input $I_2$ from an upstream gain cell is added to the kinetics model.

The kinetics model also determines the mass flow rate of the laser's fuel, and the gain cell's 12 pressure. These parameters are then used as the performance criteria for the closed loop fuel system's, item 18 in FIG. 1, component design. The kinetics model then determines the appropriate hardware configurations for accommodating the calculated mass flow rate of the fuel and the pressure in the gain cell 12.

The reaction rates whereby the iodine atoms are excited, used in the kinetics model are essentially the same as those used by Schlie and Rathge, as reported in R. D. JOSA, 71(9), 1083 (1981) which is herein incorporated by reference. After reviewing the relevant literature on this subject, these rates seemed representative of nominal values. Many different rates reported in the literature were used in the kinetics model as test cases to explore the sensitivities of the kinetics modeling results to input rates. The following table lists the reactions modeled and the rates used.

| Reaction | Acronym | Rate | Units |
| --- | --- | --- | --- |
| $R1 + h_{v,pump} = R + 1$ | sigmaP | 7.80E − 19 | $cm^2$ |
| $1^* = 1 + h_{v,rad}$ | Arad | 7.70E + 00 | $sec^{-1}$ |
| $1^* = 1 + h_{v,laser}$ | sigmaSE | 5.50E − 18 | $cm^2$ |
| $1 + R = R1$ | rate5 | 4.70E − 11 | $\frac{cm^3}{sec}$ |
| $I^* + R = R1$ | rate6 | 7.90E − 13 | $\frac{cm^3}{sec}$ |
| $R + R = R2$ | rate7 | 1.30E − 12 | $\frac{cm^3}{sec}$ |
| $I^* + R1 = I + R1$ | rate8 | 2.80E − 16 | $\frac{cm^3}{sec}$ |
| $I^* + I + R1 = I2 + R1$ | rate12 | 3.80E − 31 | $\frac{(cm^3)^2}{sec}$ |
| $1^* + 1 + I_2 = 2I_2$ | rate13 | 3.00E − 30 | $\frac{(cm^3)^2}{sec}$ |
| $I^* + I_2 = 1 + I_2$ | rate14 | 9.90E − 12 | $\frac{cm^3}{sec}$ |
| $I^* + A_r = 1 + A_r + heat$ | rate15 | 5.20E − 17 | $\frac{cm^3}{sec}$ |

In an effort to closely simulate the actual hardware used, known or estimated efficiencies of hardware components which had been determined experimentally were included in the kinetics model. For example, when 6 kW of microwave energy was input into the kinetics model, the overall efficiency of the laser was calculated as follows:

| Efficiencies | Symbol | Values |
| --- | --- | --- |
| power supply | $\epsilon_{pwrsp}$ | 0.9 |
| magnetron | $\epsilon_{mag}$ | 0.83 |
| UV lamp | $\epsilon_{uvlamp}$ | 0.45 |
| UV optics | $\epsilon_{uvoptics}$ | 0.7 |
| quantum efficiency | $\epsilon_{quant}$ | 0.98 |
| resonator | $\epsilon_{res}$ | 0.5 |
| UV to IR | $\epsilon_{uvir}$ | 0.21 |
| resonator/gain area ratio | $\epsilon_{rgr}$ | 0.9 |
| waveguides | $\epsilon_{wg}$ | 0.9 |
| Overall Laser | $\epsilon_{laser}$ | 0.0020 |

In the CW PIL of the present invention, the microwave subsystems 16, 17 in FIG. 1 provide power to the UV lamps 14 (see FIG. 3) such that a laser gain medium is pumped through the gain cell. The ultra violet (UV) pumping power generated by the lamps 14 of the present invention was determined by using the above efficiencies. The UV input to the gain was calculated by:

$$P_{UV} = P_{wall\ plug} * \varepsilon_{pwrsp} * \varepsilon_{mag} * \varepsilon_{uv\ lamp} * \varepsilon_{uv\ optics} * \varepsilon_{quant} * \varepsilon_{uvir} * \varepsilon_{wgp} \quad (1)$$

The UV flux was calculated for a 1 cm2 square, (assuming the UV reflector focused the radiation to a 1 cm wide maximum intensity zone) 25.4 cm long gain cell 12 as shown in FIG. 3 This system required 8.03 kW of input (wallplug) power to give 6 kW of microwave power resulting in 170 W of useful UV power delivered to the fuel. To make this determination, input parameters are entered into the kinetics model as listed below:

| INPUT CHARACTERISTICS | VALUE |
| --- | --- |
| Microwave Power | 6000 watts |
| Fuel Pressure | 20 Torr |
| Flow (Gain) | 100 m/s |
| Residual Iodine | 0 molecules/cm$^3$ |
| G Width (flow) | 1 cm |
| GL (bulb length) | 25 cm |
| G Height | 1 cm |
| AR (Pressure) | 0 Torr |

Resonator parameters are similarly entered. Resonators can be of either the "stable" or "unstable" type. Resonators accommodate the characteristics of the active medium and the diffractive properties of the radiation generating in the lasing process. A stable resonator is one that has convergent optics. An unstable resonator has divergent optics. The resonator that was modeled was a stable resonator.

The calculated UV flux to the gain region and the operator selected "starting" IR intensity were:

| Fluxes | | Value |
| --- | --- | --- |
| UV intensity | $L_{UV}$ | 3.5613E + 18 photons/cm$^2$*sec |
| IR intensity | $L_{IR}$ | 4.6396E + 19 photons/cm$^2$*sec |

The UV flux reaching the gain region is denoted as $L_{UV}$ $L_{R1}$, $L_{UV}$ L $R_2$, and $L_{UV}$ $L_{R3}$ in 1 cm$^2$ transverse areas oriented vertically down. The UV flux reaching the gain cells were calculated using Beer's Law.

$$I = I_o e^{-\sigma_{se}(RI)\Delta x} \quad (2)$$

UV Flux Reaching Vertically Oriented 1 cm$^2$ Transverse Sections

| Fluxes | Symbol | Layer | Values |
| --- | --- | --- | --- |
| Intensity Layer 1 | $L_{UV} L_{R1}$ | 1 cm | 3.5613E + 18 |
| Intensity Layer 2 | $L_{UV} L_R$ | 2 | 8.2853E + 17 |
| Intensity Layer 3 | $L_{UV} L_R$ | 3 | 2.5701E + 17 |

As previously stated, to evaluate gain cells of varying heights, 1 cm$^2$ transverse section are superimposed in layers on one another. For the second and third layers of 1 cm$^2$ cells (two for the second layer and three for the third), the following equations were used.

$$I = I_o e^{-\sigma_{se}(RI)\Delta x}(0.5) \text{ and } I = I_o e^{-\sigma_{se}(RI)\Delta x}(0.67) \quad (3)$$

The kinetics model is run separately for each 1 cm$^2$ gain cell, and the results are combined to estimate the total laser performance and behavior for gain sections larger than 1 cm$^2$. Many other intermediate values are also calculated, such as, concentrations, intensities, etc,. These values are displayed on the kinetics model's spreadsheet as the program is run and the calculations proceed. The stimulated emission cross section is given by.

$$\sigma_{se\,modified} = \frac{\lambda_0^2 A_{spont}}{8\pi}\left(\frac{g_u}{g_{lu}}\right) \quad (4)$$

with values tabulated in the literature. The values are fit into a look-up table for the kinetics model spreadsheet using the following relation, with $\Delta v$ in Mhz.

$$\sigma_{se,\,modified} = 400\Delta v^{-0.960} \quad (5)$$

These values include corrections for hyperfine line degeneracies and the Voight profile, $V(\omega,a)$.

$$V_{(\omega,a)} = \frac{a}{\pi}\int_{-\infty}^{\infty}\frac{e^{-x^2}}{a^2+(\omega-x)^2}dx \quad (6)$$

where $$P_{(\omega,a)} = G(\omega) = \frac{1}{\Delta v_D}\left(\frac{\ln 2}{\pi}\right)^{1/2} V_{(\omega,a)} \quad (7)$$

The linewidth, $G(\omega)$, is determined by $$I_{sat} = \frac{4\pi n^2 h\nu}{\left(\frac{\tau}{t_{spont}}\right)\lambda^2 \eta g(\nu)} \quad (8)$$

with $\tau = t_{spont}$, $\eta = 1$, and $$\frac{1}{g(\nu)\eta} = \Delta v$$

where $\Delta v$ is the linewidth.

$$k = \frac{2\pi}{\lambda} = \frac{\omega}{c} \quad (9)$$

The pressure broadened linewidth is determined to be based on the reported 15+/−4 Mhz/Torr for $C_3F_7I$. The linewidth is calculated for each case on the kinetics model by root-sum-squaring (RSS), both the Doppler linewidth of 400 Mhz (FWHM, at 20 Torr) and the pressure broadened linewidth. Saturation intensity values of 440, 770, and 1150 W/cm$^2$ are among several reported. Most of these are for COIL lasers, which have kinetics that are considerably different from the PIL kinetics due to the lower pressures, it suggests that $I_{sat}$ may be in the same region. Since hyperfine rates have only been theoretically estimated, firm $I_{sat}$ values have not been established.

$$\Delta v = \sqrt{\Delta v_D^2 + \Delta v_H^2}$$

$$\Delta v = \sqrt{(400)^2 + (1890)^2} = 1890 \text{ Mhz} \quad (20 \text{ Torr})$$

This linewidth is calculated for each pressure used, within the spreadsheet.

The kinetics model addresses the hyperfine levels by assuming a weak collision model. Additionally, it is assumed that any hyperfine level can rapidly relax to any other hyperfine level. Because the velocity and hyperfine cross-relaxation rates are very rapid, the medium is assumed to saturate homogeneously, since all calculations are at pressures of 14 Torr and greater. The small signal gain is treated as being independent of velocity and hyperfine cross-relaxation rates. The temperature dependence of the linewidth is not treated here.

Finite Difference Kinetics Model of Transverse Flow PIL with Rigrod Resonator using Steady-State Approximation The rate of change of excited atomic iodine ($I^*$) is described by $$\left(\frac{dI^*}{dt}\right) = F_{uv}\sigma_{pump}(RI) - k_{I_2}(I^*)(I)(RI) - \sigma_{se}F_{IR}(I^*)(I)(I_2) - kg(I^*)(RI) \quad (10)$$

This steady state approximation makes the kinetics model suitable to run on a PC spreadsheet-based program. It gives reasonably accurate results, and is fast enough, such that sufficient cases can be run to provide trends as parameters are changed and designs varied. A finite difference method is used where ($I^*$) and ($I_2$) are calculated in time increments assuming that the resonator started with constant CW fuel flow, UV pumping, and stable pressure. Initial concentrations of all species except the fuel $C_3F_7I$ (RI) are zero.

A steady-state approximation is assumed for the gaseous radicals, ground state atomic iodine, and $C_3F_7$ (R). Due to the rapid rates, the concentrations are assumed to be small and constant. Other species such as $I_2$, excited atomic iodine ($I^*$), RI, and R2 ($C_6F_{14}$) are assumed to be larger in concentration and variable. The rate of change of ground state atomic (I) is $$\left(\frac{dI}{dt}\right) = k_1 + (I^*)(I_2) + \sigma_{se}F_{IR}(I^*) + A_{spont}(I^*) - k_5(I)(R) - K_{13}(I^*)(I)(I_2) \quad (11)$$

and the rate of change of radical $C_3F_7$ (R) is $$\left(\frac{dR}{dt}\right) = \sigma_{pump}F_{uv}(RI) - k_5(I)(R) - 2k_7(R)^2 \quad (12)$$

This can be simplified to $$\left(\frac{dR}{dt}\right) = \sigma_{pump}F_{uv}(RI) - k_5(I)(R) \quad (13)$$

To further simplify this model, the three-body deactivation reaction with $I_2$ is assumed to be slower than the three-body deactivation reaction with the fuel RI. Since the fuel is significantly higher in concentration (40–50 times) than ($I_2$) levels at all times, the overall rate of excited iodine deactivation is approximately 10 times faster for the fuel three-body deactivation reaction. The spontaneous emission rate is markedly slower than any other rate and is assumed insignificant. Therefore, $$\left(\frac{dI^*}{dt}\right) = \sigma_{pump}F_{uv}(RI) - k_1 + \quad (14)$$

-continued
$$(I^*)(I_2) - \sigma_{se}F_{IR}(I^*) - k_8(I^*)(RI) - k_{12}(I^*)(I)(RI)$$

In order to solve this equation for ($I^*$), the value of ($I_2$) and the infrared flux, $F_{IR}$, must be determined, all other values being known. The rate of change of ($I_2$) is $$\left(\frac{dI_2}{dt}\right) = k_{12}(I^*)(I)(RI) + \frac{1}{2}k_{13}(I^*)(I)(I_2) \quad (15)$$

Again, assuming that the overall rate of excited iodine deactivation is approximately 10 times faster for the fuel three-body deactivation reaction, as described above, this simplifies to $$\left(\frac{dI_2}{dt}\right) = k_{12}(I^*)(I)(RI) \quad (16)$$

$$\int_{t1}^{t2} dI_2 = \int_{t1}^{t2} k_{12}(I^*)(I)(RI)dt \quad (17)$$

To solve for ($I_2$), the concentration of ground state atomic iodine (I) must be determined. Using the steady-state approximation, $$\left(\frac{dI}{dt}\right) = 0,$$

Equation (12) can be simplified assuming (R2) is small, giving $$\left(\frac{\partial R}{\partial t}\right) = 0 = \sigma_{pump}F_{uv}(RI) - k_5(I)(R) \quad (18)$$

and $$\sigma_{pump}F_{uv}(RI) = k_5(I)(R) \quad (19)$$

Solving for (I) gives $$I = \frac{\sigma_{pump}F_{uv}(RI)}{k_5(R)} \quad (20)$$

Subtracting equation (14) from equation (11) and substituting equation (19) gives the rate of change of excited iodine over incremental time increase (t1 to t2).

$$\frac{dI^*}{dt} = 2\sigma_{pump}F_{uv}(RI) - 2k_1 + (I^*)(I_2) - 2\sigma_{se}F_{IR}(I^*) - k_8(I^*)(RI) \quad (21)$$

$$\int_{t1}^{t2} dI^* = \int_{t1}^{t2} 2\sigma_{pump}F_{uv}(RI)dt - \int_{t1}^{t2} 2k_1 + \quad (22)$$
$$(I^*)(I_2)dt - \int_{t1}^{t2} 2\sigma_{se}F_{IR}(I^*)dt - \int_{t1}^{t2} k_8(I^*)(RI)dt$$

However, (R) is not known and must be calculated.

To solve for (R), a steady state approximation is used where $$\left(\frac{dR}{dt}\right) = 0.$$

The rate of change of (R) is $$\left(\frac{\partial R}{\partial t}\right) = 0 \qquad (23)$$
$$= -\sigma_{pump}F_{uv}(RI) + k_1 + (I^*)(I_2) + \sigma_{se}F_{IR}(I^*) - k_{12}(I^*)(I)(RI)$$

Solving for the ground state atomic iodine (I) concentration gives $$(I) = \frac{\int_{t1}^{t2}(I^*)(k_1 + (I_2)dt + \sigma_{se}F_{IR}dt) - \int_{t1}^{t2}\sigma_{pump}F_{uv}(RI)dt}{\int_{t1}^{t2}k_{12}(I^*)(RI)dt} \qquad (24)$$

The concentration of ($I_2$) can now be determined, and is a sum over the finite difference as a function of time using Equation (16).

$$\int_{t1}^{t2} dI_2 = \int_{t1}^{t2} k_{12}(I^*)(RI)dt \qquad (25)$$

The kinetics model is assembled on a spreadsheet, as a finite difference model using $$\left(\frac{\partial I^*}{\partial t}\right) = -V\left(\frac{\partial I^*}{\partial x}\right) + \frac{\Delta x^2}{2\Delta t}\left(\frac{\partial^2 I^*}{\partial x^2}\right) \qquad (26)$$

where V is the linear flow velocity of the fuel. The second term is assumed to be small and Equation (26) becomes, $$\left(\frac{\partial I^*}{\partial t}\right) = -V\left(\frac{\partial I^*}{\partial x}\right) \qquad (27)$$

In traditional flowing gas lasers, the time element $$\left(\frac{\partial I^*}{\partial t}\right)$$

is transformed into distance downstream $$\left(\frac{\partial I^*}{\partial x}\right)$$

in the flow as shown in Equation (27), with incident pump energy the start, or x=0, parameters. However, since the kinetics model of the present invention is assumed to pump uniformly over a significant 1 $cm^2$ transverse area in the flow direction, the kinetics model is a peculiar mix of finite difference steps in time, with some unknown relation with I* as the gas flows downstream. In other words, the I* versus distance (time increments) curve is similar to, but not actually, the behavior of the I* in the flow direction.

Model Execution

The kinetics model makes several calculations per time (flow distance) increment. The power of the spreadsheet approach is that all intermediate calculations, and all calculated intensities, concentrations, gains, etc. can be displayed easily for each time increment, facilitating better understanding of the kinetics model as well as the laser. The calculation steps taken by the kinetics model are as follows.

Step 1

Calculation of (I*) using equation (22)

$$\int_{t1}^{t2} dI^* = \int_{t1}^{t2} 2\sigma_{pump}F_{uv}(RI)dt - \int_{t1}^{t2} 2k_1 + \qquad (22)$$
$$(I^*)(I_2)dt - \int_{t1}^{t2} 2\sigma_{se}F_{IR}(I^*)dt - \int_{t1}^{t2} k_8(I^*)(RI)dt$$

using values of ($I_2$), (I*), and $F_{IR}$ from the previous step.

Step 2

Subtract the (I*) lost to the three-body deactivation reaction.

$$\left(\frac{\partial I^*}{\partial t}\right) = k_{13}(I^*)(I)(I_2) \qquad (28)$$

Step 3

Calculate the ($I_2$) concentration change using Equation (25)

$$\int_{t1}^{t2} dI_2 = \int_{t1}^{t2} k_{12}(I^*)(RI)dt \qquad (25)$$

Step 4

Correct the ($I_2$) concentration for linear fuel flow velocity and the resultant decrease steady state ($I_2$) concentration, $$(I_2)_{corrected} = (I_2) - \frac{I_2(1\ \text{cm})_{gain\ cell}}{\text{Flow Rate (cm/s)}}\Delta t \qquad (29)$$

Note that the (I*) concentration is not corrected for linear flow velocity since the lifetime of excited iodine (I*) relative to the stimulated emission is on the order of one nanosecond at 15–20 Torr, therefore, the flow can thus be considered to be stagnant.

Step 5

Calculate the small signal gain of the laser from the population inversion of the excited state atomic iodine (I*) to the ground state (I).

$$\alpha = \frac{\left(N_2 - \frac{g_u}{g_l}N_1\right)\lambda^2 \eta g(\nu)}{8\pi n^2 t_{spont}} \qquad (30)$$

where $$\eta = \frac{\varepsilon}{\varepsilon_0},\ t_{spont} = \frac{1}{A_{spont}},\ \text{and}\ \frac{g_u}{g_l} = 0.5$$

Step 6

Calculate the circulating intensity of the resonator using a simple Rigrod resonator to determine the infrared flux (used in the spreadsheet calculation to calculate the stimulated emission).

$$I_{out} = \frac{I_{sat}}{\left(1 + \frac{r1}{r2}\right)(1 - r1r2)}\left[2\alpha_{mo}L - \ln\frac{1}{r1r2}\right] \qquad (31)$$

Where r1 and r2 are the e field reflectivity's of the end mirrors, R1 and R2 are the $\epsilon^2$, or power reflectivities, $\alpha_{mo}$ is the small signal gain, L is the single pass length of the gain, and $I_{sat}$ is the saturation intensity of the laser.

$$R_1 = r_1^2 \quad (32)$$

In delta notation, the transmission and reflectivities of the end mirrors are related by $$R_1 = 1-\delta_1 = T_1 \quad (33)$$

$$R_2 = 1-\delta_2 = T_2 \quad (34)$$

The total loss of the resonator is represented by $\delta_c = \delta_0 + \delta_1 + \delta_2$ where the linear gas absorption loss, do, is assumed to be zero. The losses due to resonator mirrors are $$\delta_c = \ln\frac{1}{R_i} = 2\ln\frac{1}{r_i} \approx \ln\frac{1}{R_1 R_2} \text{ or,} \quad (35)$$

$$\delta_c = 2\alpha_0 p + \ln\frac{1}{R_1 R_2} \approx \ln\frac{1}{R_1 R_2} \quad (36)$$

where $\alpha_0$ is assumed very small. The small signal gain in delta notation, $\delta_m$, is presented by $$\alpha_m = 2\alpha_m P_m \quad (37)$$

where $\alpha_m$ is the gain per cm and pm is the single pass gain length. Also, the loaded gain, $\alpha_m$, is calculated for homogeneous broadening by $$\alpha_m = \alpha_{m0} + \frac{1}{1+\frac{1}{I_{sat}}} \quad (38)$$

Step 7

Return to Step 1 using values determined in this finite $\Delta t$ (or $\Delta x$) incremental step.

Model Details on Starting and Population Levels

On start up of the kinetics model, all concentrations were zero except for the fuel (RI) and all fluxes were zero except for the UV flux, $F_{UV}$, which is constant. A starting infrared flux, $F_{IR}$, is used in the second step to initiate the stimulated emission. Due to the mathematical instability of the kinetics model after 40–50 time increments, various techniques were attempted:

a) increasingly fine time increments down to values similar to the rate constants (10–18 s).
b) averaging of ground state atomic iodine (I) values over several time increments steps to dampen oscillations.
c) automatic sampling.

The instabilities were due to the oscillation of concentration of ground state atomic iodine (I). This was determined by fixing the values of each species or parameter in turn or in combination. The kinetics model was relatively insensitive to the circulating infrared flux, $F_{IR}$, values.

The ground state atomic iodine (I) concentrations were found to oscillate over small levels for several cycles (e.g., between 10–11 and 10–12 molecules/cm³). Averaging of these values over a series of oscillations and using this average value for the rest of the time steps, eliminated most instabilities in the kinetics model.

Fixing (I) early in the kinetics model's time increments fixes the ground state population, in contrast to clamping of the inversion level for lasing conditions. On the other hand, the complexity of the iodine laser with degeneracies of both ground state and upper states, due to hyperfine levels, makes this approach questionable. The hyperfine levels must be modeled in order to adequately address this problem. The results herein are based on rapid equilibration between both upper and lower states which is generally accepted at higher pressures. As addressed above, the pressure broadened line widths for cases run with this model are large, giving $I_{sat}$ values of 505 W/cm² for most cases. Only when very short pulsed operation is modeled would hyperfine levels possibly not contribute. This effect can be described phenomenologically by ascribing an increase in the penetration capability of the higher intensity beams. When the cutting speed for conventional lasers used in manufacturing has been optimized for a particular thickness of material using a conventional laser system, the PIL system of the present invention would be operating in an over-penetration mode. This indicates that the cutting speed when using the CW PIL of the present invention, can be increased significantly.

Pulsing an Nd:YAG FPL does not provide the same power density advantages because the cutting rate will be determined by the repetition rate of the laser. A 500 Watt average power laser, operating at 500 Hz, will in the example given in Table II have a normalized feed rate of 40.

The computer models were used extensively during the development of the CW PIL. However, the results of the kinetics model had to be verified for accuracy. Experimental data on CW PILs is very limited. Therefore, since Textron Defense System's (Textron DS) pulsed PIL also uses the fuel $C_3F_7I$, it was decided that modeling this laser would be a good test case. Since data existed for this laser, it would allow for verification of the CW PIL models. The variables analyzed using the Textron DS PIL included:

1) an orifice plate using pin-fin plate-fin surfaces;
2) two liquid pumps and an iodine scrubber;
3) all tubing, elbows and friction components, as well as, the condenser, and the heat exchangers;
4) gas tubing diameters of 3, 4, 6 and 8 inches and liquid tube diameters of 1 and 2 inches; and
5) pressure of 30 Torr in the gain.

The kinetics models were run by first specifying the temperature, and hence the pressure, of the fuel at the evaporator exit. The desired pressure in the gain region was also specified. Since pressure drops due to friction are velocity dependent, the flow velocity, V, that satisfies all the above specifications is then determined by iteration until the gain cell's pressure is that which was initially specified (or the evaporator temperature can be varied for fixed velocities until the gain cell is at 30 Torr in a steady-state system). The remaining parameter of interest is the mass flow rate of the fuel, a constant for steady state flow.

$$dm/dt = \rho A V \quad (39)$$

The mass flow rate of the Textron PIL was determined within the gain region where all input parameters are specified. The desired temperature and pressure in the gain region were used to specify the density, $\rho$, within the gain by the ideal gas law. The gain cross sectional area, A, and the fuel's velocity, V, were specified.

The technical results of this study, using Textron DS's PIL, were that 1) using 3 in. piping and approximately 300 Torr in the evaporator results in allowable flow rates in the range of 2–6 m/s, a result comparable to Textron's result with Freon (#134) with a molecular weight similar to $C_3F_7I$.

2) The fuel flow curve is dominated by the orifice plate.
3) It was also found that, as the tubing diameter is increased, so is the flow rate due to lower frictional losses.

In addition to determining the maximum achievable flow rate for PILs, pressure drops as the fuel moves from the evaporator to the condenser were determined. It was found that:

1) liquid pressure drops are almost independent of the liquid tubing diameter when the diameter exceeds 1 in;.
2) the most noticeable pressure drops are in the liquid stage, yet varying liquid stage hardware sizes, types has minimal effect on the system flow rate and pressure drops. On the other hand, pressure drops in the gas phase were no very noticeable, yet the system flow rate and pressure drops are sensitive to small changes in the gas phase hardware.

The maximum calculated flow rates, using optimum sized liquid gas, and phase dimensioning and for different tubing diameter sizes are shown below.

| Tubing Size | Flow |
| --- | --- |
| 3 in. | 6 m/s |
| 4 | 10 |
| 6 | 18 |
| 8 | 24 |

Textron DS's PIL uses a "blow down" fuel system whereby an orifice plate is used to govern the character of the fuel flow into the gain cell. Based on the results obtained from running the computer model, it was determined that small holes in the orifice plate do not appear to give supersonic flow as in HF, DF and COIL nozzles. Due to the high molecular weight of the PIL fuel, the equivalent conductance (loss coefficient K) is very high in small holes. Above 1 atm., the laser is not acceptable for commercial purposes due to safety concerns in the case of gas leaks. At a flow velocity in the gain of 20 m/s the pressure in the evaporator is about 2 atm.

To provide for integration in a production setting, the following design capabilities are included in the present invention. The microwave subsystem employs a high voltage power supply (HVPS), integration with the (HVPS) subsystem was accomplished using I/O signals between the PIL's Programmable Logic Controller (PLC) and the power supply's control system. Communications included event and fault status of the laser system and of the HVPS subsystem. The PLC also provided an external fault loop for the microwave subsystem and the HVPS subsystem. The external fault loop addressed adequate supplies of air flow, water cooling, and other support requirements needed for safe operation of the microwave and HVPS subsystems.

The PLC also provides control I/O signals for the (HVPS). These include high voltage on, off, and enable and disable signals. The PLC provides functional control of the HVPS and displays the condition of the microwave and HVPS subsystems either as visual screen displays, printed hard copy outputs, or as digital records. These conditions include HVPS and microwave subsystem voltage, current, fault status, ready and triggered states. Control and display of these systems can also be accommodated by an associated Personal Computer (PC) connected to the PLC.

In addition to the foregoing, system integration of the PIL with commercial machining centers was investigated by contacting several manufacturers. Based on these results, the following design capabilities are included in the present invention to facilitate integration into a commercially available machining center:

1) Digital or analog I/O signals are used to communicate the machine center's event status, voltages, currents, fault status, ready and triggered states.
2) Digital or analog I/O signals establish control between the PLC and the machining center. Conditions of the machining center can be either visual screen displays, printed hard copy outputs, or digital records.
3) Data Highway communication with a PLC is available. Information can be obtained directly from the PLC or from the PC. Since Data Highway allows interrogation of all the information that is connected to the PLC, then not only is the digital I/O available but also the analog signals. These include pressure and temperature.

The machine center interface of the present invention includes standard digital interfaces, such as RS-232, present on most PCs. Since the PC is connected to the PLC via the Data Highway, then all of the above signals can be obtained and transmitted to the machine center. Also, if the machine center has RS-232 capability then its status can be interrogated.

Because the present invention is intended for use in an industrial setting, several constraining factors had to be considered. Constraints involving output power scaling and UV input power are implemented. Due to the expense of the fuel, its total volume within the closed cycle is minimized in the present design. The entire laser system fits within reasonably sized standard cabinets. The footprint and height of the system has been kept to a minimum so as not to occupy too much shop floor space.

Condenser and evaporator design as well as capacity evaluations were made since heat exchangers and their accompanying cooling/heating systems can dramatically affect the cost of the PIL. As a result, expensive hardware requirements, especially at the condenser, were reduced. Additionally, the system of the present invention does not waste heatants or coolants. As a result, the condenser temperature should be at −38° C. or higher so that lower cost coolers can be used.

System Scaling To Higher Power

Scaling of the CW PIL to higher performance and power, impacts the size and design of the fuel system. Consequently the blow-down method was a means for reducing the required fuel mass flow rates. The blow-down method (use of an orifice plate) combined with a very effective iodine scrubber and low friction fuel delivery system reduces the cooling requirement needs for very expensive ultra-low temperature coolers (operating down to −73° C.). Low cost, high capacity models with cooling down to −38° C. are therefore used. Preliminary modeling results of the CW PIL of the present invention, indicated that maximum flow rates of 10–12 m/s are achievable with a blow-down system, and have highest pressures about 600–650 Torr. These flow rates are similar to those for traditional, well-designed systems. The chief advantage of using the blow-down system is that it eliminates the ultra-low temperature coolers and insulation problems associated with very cold tubing.

Scaling up of the PIL also involves higher UV input power. The kinetics model established the required UV lamp performance and hardware configurations that provide the appropriate boost in laser output power. As the UV pumping power is increased the concentrations of I* and $I_2$ increase. The increases in the concentrations of these species are approximately linear with increasing UV power.

This determination results in a new gain cell design which takes advantage of the higher flow and UV input power. In order to increase the flow rate through the gain region, required by the higher pressure requirement, and the higher condenser temperature, the gain cell had to be redesigned. The new gain cell design is the result of varying the gain cell dimensions and exercising the HVAC model to determine resultant performance. The result is 1) The gain cell length was doubled from 10 in. to 20 in.
2) The flow diffuser which facilitates the transition from the smaller fuel system conduits to the larger feed inlet conduit was refined.
3) 4 lamps, two on each side of the gain cell, are used.

Different PIL configurations were studied by varying the pressure, orifices, and flow rates. These studies resulted in an optimal design which comprises the following:

1) 45 Torr pressure in the gain region and use of an orifice plate with a conductance K=500.
2) 24 m/s flow rate within the gain region with no need for a blower to enhance flow rate.
3) 6 in. fuel inlet tubing, and 7 in. condenser, evaporator and heat exchangers.
4) A 1 in.×20 in. gain cell having a height of 20 cm. in the flow direction.
5) An evaporator that operates at 0 to 16° C. and a condenser operates at −38° C.
6) A laser output that is 95% of the maximum estimated power.

This design will provide laser output power equivalent to 95% of the maximum estimated power.

Additionally, it was established that if the feed inlet to the gain cell has an interior cross section in the form of a parallelogram, it must include air foils or flow vanes 116 as shown in FIG. 19. These foils or vanes 116 provide for a flow which comes very close to being laminar with minimal turbulence. They also insure that the gas flow rate across the paralellogram feed inlet is uniform in all areas.

Alternate Fuels

Two other methods exist for increasing power: 1) use of new UV plasma lamps having more emitted power matched to the absorption lines of the fuel and, 2) the use of alternate fuels which absorb more radiation in the higher output frequencies of existing or new UV lamps.

The fuel flow computer model (HVAC) was extensively used to determine the effect of the use of these higher molecular weight compounds. Alternate fuels $C_4F_9I$ and $C_5F_{11}I$, as well as the typical fuel $C_3F_7I$ were evaluated using the HVAC model. The HVAC model did not incorporate a blower and included post-coolers and pre-heaters before the condensor and after the evaporator respectively. Gas phase tubing diameters of 3, 4, and 6 inches and gain pressures of 20, 30, and 45 Torr were modeled. Additionally, 4, 5, and 7 inch heat exchangers, condensers, and evaporators were used with these respective tubing sizes.

The HVAC model starts its calculation at the exit of the evaporator and ends at the liquid stage within the evaporator, m having already been determined for the system. For each element described below, changes in pressure and temperature are calculated. These changes are then added to the pressure and temperature input to the element to provide the output data.

The HVAC model currently accepts seven types of elements:

1) constant area pipe
2) local effects such as elbows, valves, etc.
3) single phase heaters
4) single phase coolers
5) evaporators
6) condensers
7) simple heat addition of given magnitude, such as heating from the UV lamps.

The two single-phase heat exchangers of the CW PIL of the present invention, use water as the fluid with which heat is exchanged while the evaporator and condenser use polysiloxane due to the extremely low temperatures required by the scrubber for Iodine scrubbing.

Heat is transferred from one fluid to the another through the walls of the tubing in the heat exchangers according to the equation.

$$\dot{Q} = \overline{U}A\Delta T_m$$

with $\Delta T_m$ being an average of input and output temperatures. $\overline{U}$ is the mean overall coefficient of heat transfer and depends on the heat transfer coefficients, h, of the two fluids, the thermal conductivity, k, of the tube through which one fluid flows, and the geometry of the tubing in the heat exchanger. "A" is the area available for heat transfer. Note that this equation is hardware dependent through its dependence on $\overline{U}$. Regarding either fluid, the heat transferred can be written as $$\dot{Q} = \dot{m}c_p(T_{hot} - T_{cold})$$

Geometric input for these heat exchangers consist of 1) the number of pipes in both dimensions,
2) the pipe inner and outer diameter using a built-in table of standard heat exchanger pipes,
3) the pipe spacing in both dimensions and
4) the pipe lengths.

This information is used in the HVAC model primarily to determine the pressure drop across the heat exchanger. The other temperatures and flow rates of the other fluid going through the heat exchanger is also input. Thermodynamic tables for both water and polysiloxane are built into the HVAC model. This provides for determination of the temperature change in the fuel which in turn specifies the required heat capacity of the heat exchanger.

All of the calculations for the heat exchangers (coolers, heaters, condensers, and evaporators) are performed on separate spreadsheets that are linked to the main spread sheet in the HVAC model. This allows great flexibility for using different heat transfer hardware configurations.

Turning now to the condenser, the shell side heat transfer coefficient used in $\overline{U}$ for a condenser is from the standard Nusselt equation for the condensation heat transfer coefficient along banks of horizontal tubes. The saturation pressure is taken to be the entrance pressure. The gaseous fuel coming into the condenser is superheated (i.e. its temperature is well above the saturation temperature determined by the Clausius-Clapyron relationship given above).

This superheat is ignored in the heat transfer calculations so the saturation temperature is taken for the vapor temperature. Since the liquid leaving the condenser is that which has just been condensed, the temperature is also the saturation temperature. The phase change heat transfer (latent) heat of vaporization is hvap. The heat used for just change of state is given by $$\dot{Q} = \dot{m}h_{vap}$$

the symbol h=enthalpy.

The pressure drop across the condenser is half of that for the input gas going through the same heat exchanger without condensation. An adequate model for pressure drop in two-phase systems is extremely difficult to find in the literature. Apparently, this information is proprietary to the heat exchanger manufacturers. Those pressure drops that are specified are also known to be good to within 50%—a large margin of error.

The evaporator is modeled in the HVAC model as a single (liquid) phase heat exchanger whose output temperature is specified.

The input temperature is that of the liquefied fuel coming out of the condenser. The output temperature was specified during the initial HVAC model setup. By ignoring changes in kinetic and potential energy in the first law of thermodynamics, both reasonably small, it is then assumed that all the heat transferred becomes a change in enthalpy. Since the input and output temperatures are known, the heat transferred is just $$\dot{Q} = \dot{m}\Delta h$$

Since the fluids are assumed to be ideal, their enthalpies depend only on the temperature. This heat is used in two fashions. The first is during the heat exchange process where again $$\dot{Q} = \overline{U}A\Delta T_m.$$

The other (and typically dominant) heat exchange process is vaporization. The amount of heat going into vaporization was given above $$\dot{Q} = \dot{m}h_{vap}.$$

The polysiloxane in the heat exchanger provides the heat for both processes. The pressure drop is taken to be that of a single phase heat exchanger described above since the evaporator is assumed to be flooded. Simple heat addition at a rate of $\dot{Q}$ results in a temperature change of $$\dot{Q} = \dot{m}c_p(T_{hot} - T_{cold})$$

Major and minor losses and the effect of blowers and pumps are also determined by HVAC model. These terms are standard in the fluid mechanics discipline and no heat transfer is assumed. Major losses are those that are non-local; i.e. friction losses in pipe flow. The minor losses are local losses; i.e. those due to valves, elbows, bends etc. Major (distributed and frictional) losses are described by $$h_{loss} = f\left(\frac{L}{D}\right)\frac{V^2}{2g} \text{ (head loss)}$$

where L is the length of the pipe considered, D is the hydraulic pipe diameter which is an effective diameter for non-circular cross section pipes, and f is the friction. (Note that here "h" is not enthalpy but head loss, and $\dot{Q}$ is not heat but volume flow rate.) Friction for laminar flow is described by (Reynolds number=Re=VDρ/η<2300)

f=64/Re. (Dhydraulic=actual D)

Here V is the flow velocity, D, the hydraulic diameter, ρ the density and η the fluid viscosity.

For turbulent flow (Re>4000), the friction is taken from the Moody chart, which is approximately given by $$f = \left[1.14 - 2\log\left(\frac{\varepsilon}{D} + \frac{21.25}{Re^{0.9}}\right)\right]^{-2} \text{ (}\varepsilon = \text{the pipe's surface roughness)}$$

The frictional loss is actually flow energy lost to heat; it is a transfer of energy from flow work (the pressure term) to internal energy. The change in internal energy is modeled in terms of a dimensionless irreversible loss coefficient K:

K=f(L/D)

Minor (local) losses are determined from equivalent conductances, K, which can be found in Tables such as Applied Fluid Dynamics Handbook by R. D. Blevins, ASHRAE Journal, etc. for components such as elbows, valves, orifices, etc.

$$h_{loss} = K\frac{V^2}{2g}$$

A typical equation (incompressible fluid, gas Mach number of <0.3) for a single diameter pipe is $$\Delta p = \frac{1}{2}K_{total}\frac{\rho V^2}{2} + \gamma \Delta z$$

where $K_{total}$ includes all major and minor losses. When the cross sectional area of the pipe changes, the velocity changes but the volume flow rate $\dot{Q}=VA=\dot{m}/r$ is held constant by conservation of mass.

A pump/blower does work on the fuel to increase its pressure. This can be described by Euler's turbine equation $$-\frac{dW_{shaft}}{dt} = \rho Q[U_{out}V_{tout} - U_{in}V_{tin}]$$

with u=ωr and V being the tangential component of fluid velocity which is parallel to u. Bernoulli's Equation (first law with no heat transfer) for change in head, H, for a pump efficiency of $\epsilon_{pump}$ is $$\left[\frac{p_2}{\gamma} + \frac{V_2^2}{2g} + Z_2\right] = \frac{e_{pump}}{g}\left[\vec{U}_2 \cdot \vec{V}_2 - \vec{U}_1 \cdot \vec{V}_1\right] + \left[\frac{p_1}{\gamma} + \frac{V_1^2}{2g} + Z_1\right]$$

Conventional PIL systems exhibit large frictional losses. Modeling of both 2 in and 3 in. systems resulted in fuel flow rates of 1–2 m/s in the gain without a pump and 3–5 m/s with a pump, assuming a pressure increase of about 2× times due to the addition of a blower.

The HVAC model results show that a four inch system yielded flow rates of 3–4 m/s without a blower. With a blower, the flow rate increased to 5–6 m/s. Increasing the size of the system to 6 in. diameter tubing and 6 in. valves increases the flow rate to 8–10 m/s without a blower, and to 15–18 m/s with a blower.

The hardware specified in the 4 and 6 in. systems consisted of:

a) straight through gate valves versus angled valves
b) no sharp edged transitions—all edges had ¼ in or larger rolled chamfers.
c) heat exchangers and condensers and evaporators are larger than the overall 4 or 6 in tubing respectively to maintain the low friction design.
d) tubing lengths are minimized
e) elbows are designed with radii large enough to have maximum equivalent conductances The HVAC model calculates the following parameters:

a) temperature of the fuel.
c) pressure.
d) Reynolds number.
e) gas velocity.
f) delta T and delta P versus pressures reference point in system.
g) kinetic energy of the fuel.

Heating and cooling requirements (external sources) needed in a heat exchanger, condenser or evaporator are also determined by the model.

Due to the high frictional components of the fuel, it is possible to design a system where the pressure drops over the system are too large, and the flow rate cannot be maintained even with perfect condensers and evaporators. The HVAC model indicates this by negative pressures, or negative kinetic energies.

The HVAC model calculates the "manometer" effect of the pressure difference experienced by the fuel liquid phase between the condenser and evaporators. The liquid levels in the condenser and evaporator adjust to the round trip pressure difference by adjusting their heights.

The maximum flow rates were compiled for a variety of cases. The behavior of $C_4F_9I$ and $C_5F_{11}I$ are similar to $C_3F_7I$. Approximately 30 and 55° C. higher evaporator temperatures are needed for $C_4F_9I$ and $C_5F_{11}I$, than are needed for $C_3F_7I$ which has a higher vapor pressure. Because of the much higher evaporator temperatures, no orifice is needed. Maximum flow rates for these higher molecular weight fuels decreased by about 5–8% compared to $C_3F_7I$, for the same tubing sizes and gain cell pressure.

Based on the foregoing, it has been determined that the primary driver for lower hardware cost is raising the temperature of the condenser in the present invention from previously typical –60 to –70° C. temperatures to –38° C. This one change significantly reduces the cost of the system by enabling the use of much less expensive coolers.

The most straightforward method of increasing the gain pressure without the use of an expensive pump or blower was to raise the temperature in the evaporator and use the aforemtioned blow-down method to reduce the pressure to the right value for optimal laser extraction efficiency.

In addition to determining the maximum achievable flow rate, pressure drops as the fuel moves from the evaporator to the condenser are also of interest. The liquid pressure drops are almost independent of the liquid tubing diameter when the diameter exceeds 1 in. When running the HVAC model, the most noticeable pressure drops are in the liquid stage, yet varying liquid stage hardware sizes and types has minimal effect on the system flow rate and pressure drops. On the other hand, pressure drops in the gas phase are not very noticeable, yet the system flow rate and pressure drops are sensitive to small changes in the gas phase hardware. Dominant pressure drops occur primarily in the gas phase tubing due to tubing lengths, orifice plates, elbows, edges, etc.

A Cu wool molecular iodine scrubber is a necessity in the CW PIL of the present invention since all of the molecular iodine would be carried over from the condenser the high temperatures of the present invention. As previously stated, the effects of the liquid tubing sections are almost independent of diameter for diameters greater than 1 in.

Important aspects of the hardware design of the present invention are flexibility, modularity, low cost, high performance and simplicity. One type of design modification to the laser to achieve laser output power scaling is to incorporate more UV lamps to pump the gain medium. If the lamps are placed such that the gain region is elongated, the flow rate must be increased in order to remove the iodine, a byproduct of the reaction kinetics that quenches the gain medium, from the longer stretch of active medium. The flow rate must therefore exceed some minimal value. Changes in the flow rate affect the entire fuel system design.

As already described above, the condenser temperature should be at –38° C. or higher so that lower cost coolers can be used. Specifying the temperature of a saturated fluid specifies the pressure of the fluid. The corresponding pressure is found from the Clausius-Clapyron equation.

$$P_{SAT} = P_\infty * \exp(-hfg / RT_{SAT})$$

Figure 4:
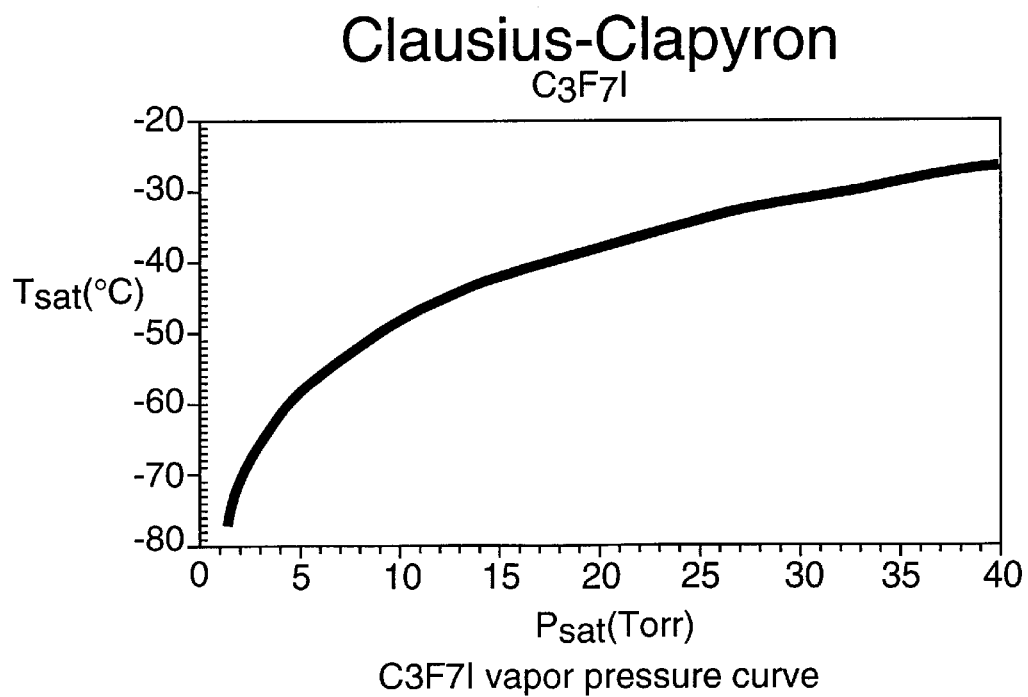
FIG. 4 is a diagrammatic illustration showing the relationship between the fuel pressure in the gain cell versus the temperature in the condenser for the CW PIL of FIG. 1.

This equation is plotted in FIG. 4 for the case of the PIL fuel, $C_3F_7I$. The fuel pressure in the system is also constrained by the optimization of kinetics reactions. Therefore the pressure drop from the gain region to the condenser must be maintained below some specified value. Since both the condenser and evaporator contain both liquid and vapor phases and they are connected by the liquid stage, they form a manometer; the liquid levels adjust to accommodate pressure difference in the associated vapor phases.

Figures 5, 5A:
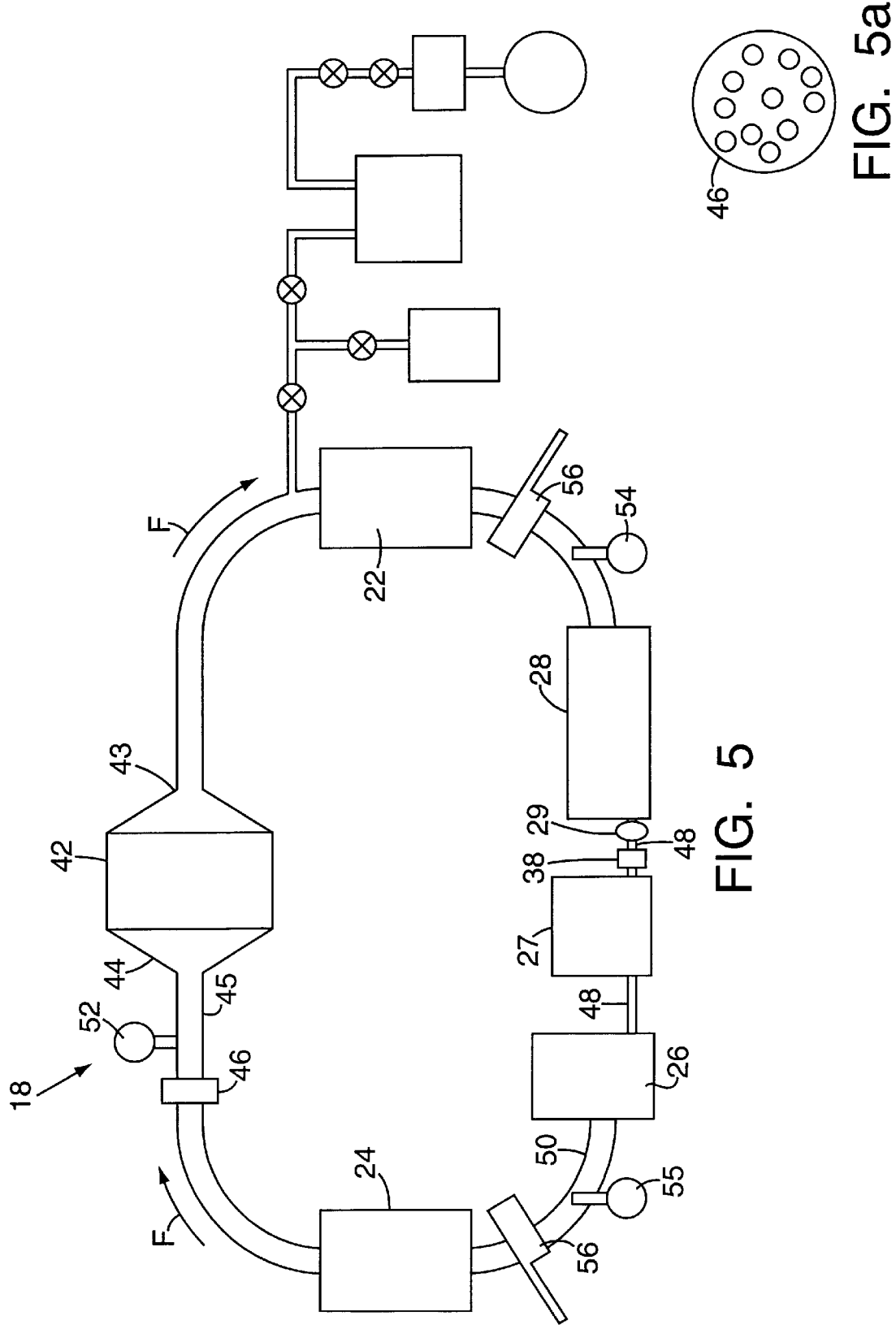
FIG. 5 is a simplified schematic illustration of the closed loop fuel system of the CW PIL of FIG. 1.
FIG. 5a is a front view of the orifice plate of the CW PIL of FIG. 1.

The evaporator exit is the only location in the closed loop fuel system in which one can specify the temperature and, by the Clausius-Clapyron equation, the pressure. After the fuel makes a round trip through the closed loop fuel system of the present invention consisting of pressure changes and heat transfer devices, the pressure in the condenser is different from that of the evaporator. According to the first law of thermodynamics, this pressure difference is made up for by a difference in liquid levels in the two heat exchangers 22 and 24 as shown in FIG. 5. The first Law of thermodynamics for a control volume with multiple inlets and exits in the steady-state is, $$\frac{dE_{cv}}{dt} = Q_{cv} - W_{cv} + \sum_{n=input} m_n \left( h_n + \frac{V_n^2}{2} + gZ_n \right) - \sum_{n=exit} m_n \left( h_n + \frac{V_n^2}{2} + gZ_n \right) = 0 \quad (41)$$

with rate of control volume energy change (0 for steady state)

$$\frac{dE_{cv}}{dt}$$

average velocity Vn
mass flow rate (kg/s) (n=a system constant=ρAV) dmn/dt
gravity g
height zn
density ρ

With no heat addition, work performed, area change or temperature change ar with a single inlet and exit, the first law degenerates into the following manometer equation.

$$P_{Exit} + \rho g Z_{Exit} = P_{Input} + \rho g Z_{Input} \quad (42)$$

The CIW PIL system of the present invention has intervening heat transfer elements 22 and 24 in FIG. 5, but still obeys the first law and therefore should still behave as a manometer but with a more complicated first law realization. Therefore in order to keep both the evaporator 26 and the condenser 28, operating properly, attention must be paid to the vertical placement of these two devices.

Figure 6:
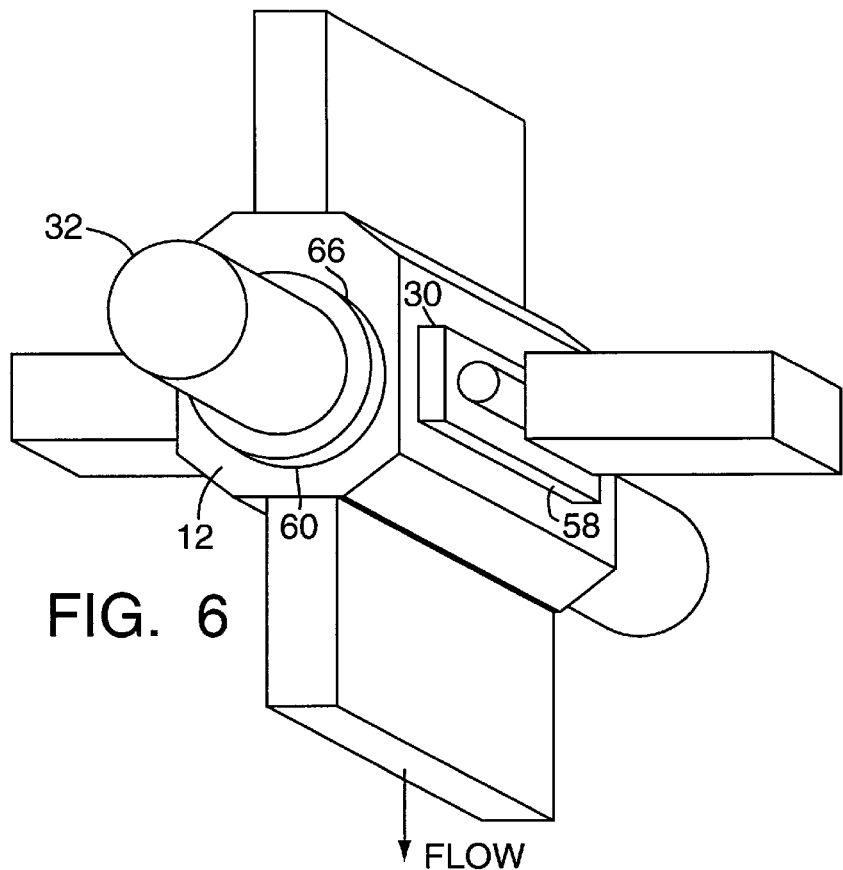
FIG. 6 is a simplified schematic of the gain cell of the CW PIL of FIG. 1.

The UV windows 30 and the resonator optics 32 as shown in FIG. 6 must be vertically oriented (perpendicular to the horizontal plane) in order to keep them clean by the action of gravity on any contaminants trying to stick to the windows. This means that the flow must be in the vertical direction as indicated below since only the vertical axis is available. A constraint in the vertical direction is that hardware to get the fuel in and out of the gain region must fit inside the cabinet, which is of limited height.

The hardware configuration within the cabinets must allow for access to all parts that must be reached for repair and/or maintenance. This constraint implies that it is not appropriate to bury subsystems within other subsystems. Laser downtime is expensive to the customer and care must be taken to keep it minimal.

There are several design aspects simplifying the laser of the present invention which reduce hardware needed, and improve performance. These are listed below.

1) Due to short, large 6 in. gas phase tubing and large 1 to 1½ in. liquid phase tubing, no pumps or blowers are required on the fuel system.
2) Heat from exothermic processes is used for heating other parts of the system—the post cooler and preheater are combined into one commercially available crossflow gas phase heat exchanger with tube fin surface.
3) The number of closed loop temperature controlled, heating and cooling systems is minimized. The heated cooling water from the refrigeration unit used to cool the condenser input into the evaporator to evaporate the liquefied fuel.

The behavior of I* and $I_2$ as the UV pumping power is increased should also be noted. The increases in the concentrations of these species is approximately linear with increasing UV power. Most of the cases modeled indicated a decreasing improvement in I* (or gain) as the highest UV pump powers were modeled. This may be due to the effects of the increasing concentrations of $I_2$, at the higher UV pumping levels, decreasing the available gain.

The frictional properties of pipes are usually stated assuming circular cross sections. However, for rectangular cross sections, the "hydraulic" diameter is used in place of the circular diameter. The hydraulic diameter is defined as $$D_{Hydraulic} = 4\text{Area}/(\text{Wetted Perimeter}) = 2*L*W/(L+W)$$

Where L=Length, and W=Width.
for a rectangle. For high aspect ratio rectangular cross sections, as are being considered in the present invention, this formula reduces to essentially, $$D_{Hydraulic} = 2*W + \text{Order}(W/L)$$

Thus, when the gain length is doubled from 10 to 20 in., the hydraulic diameter increases from 1.818 to 1.904 in for a 1 in. width gain and 3.333 to 3.636 in. for the case of a 2 in. width gain. This means that doubling the length has only a minimal hydrodynamic effect. The 20 in. design turned out to require only 20% increased flow versus that of the 10 in. gain cell. Note that for high aspect ratio rectangles, the determination of the loss coefficient, K, is an approximation and the hydraulic diameter is a little smaller than predicted, giving a higher friction. Literature tabulations of $$k = f*\text{Re}$$

were used for 10:1 and 20:1 aspect ratios giving loss coefficients of 84.909 and 89.969, respectively.

Another way in which the fuel flow rate can be increased is to use a shorter gain cell obstruction in the flow direction. The diffusers need not change, just the gain length. All designs of the present invention are for turbulent flow with Reynolds numbers of 5000 or greater. Altering the gain cell design dramatically increases the available fuel flow rate. It also helps the fuel system fit into the vertical constraints of the PIL cabinet. The result of this new design is that the flow rate increases for 30 an 45 Torr systems as shown in the following simulation results.

Figure 7:
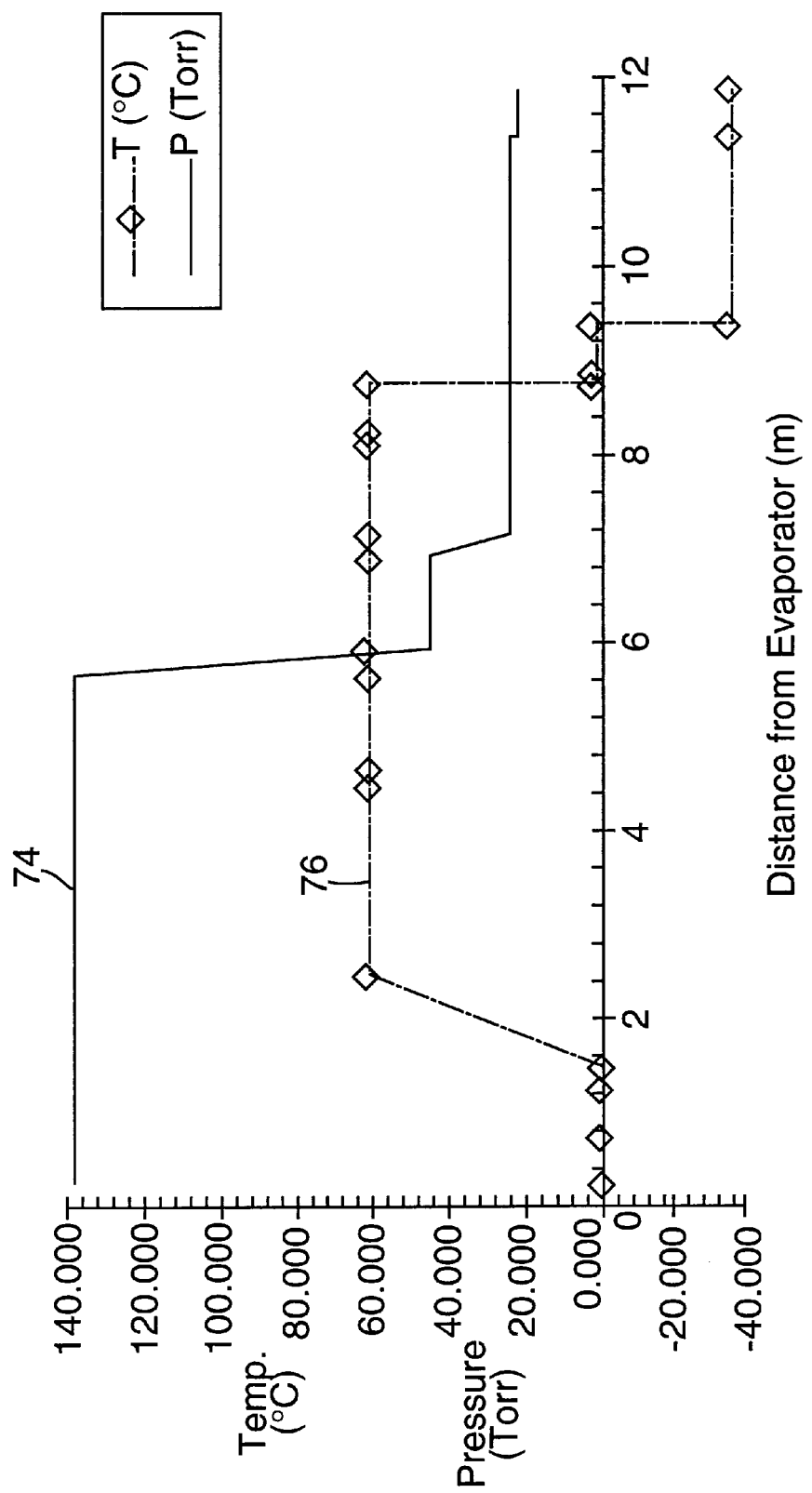
FIG. 7 is a diagrammatic illustration showing the relationship between the distance from the evaporator and the temperature and pressure in the closed loop fuel system of the CW PIL of FIG. 1.
Figure 8:
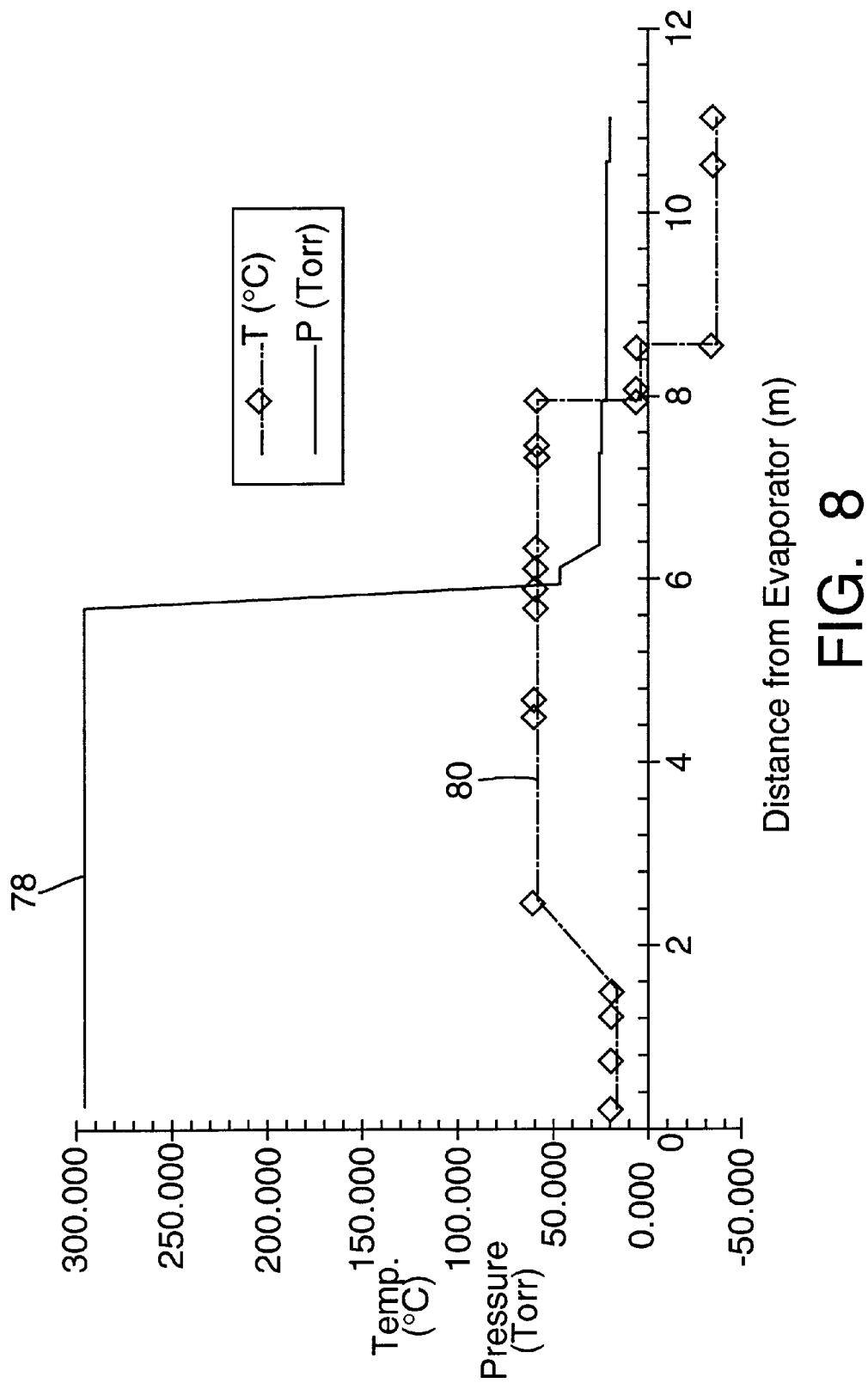
FIG. 8 is a diagrammatic illustration showing the relationship between the distance from the evaporator and the temperature and pressure in the closed loop fuel system of the CW PIL of FIG. 1.
Figure 9:
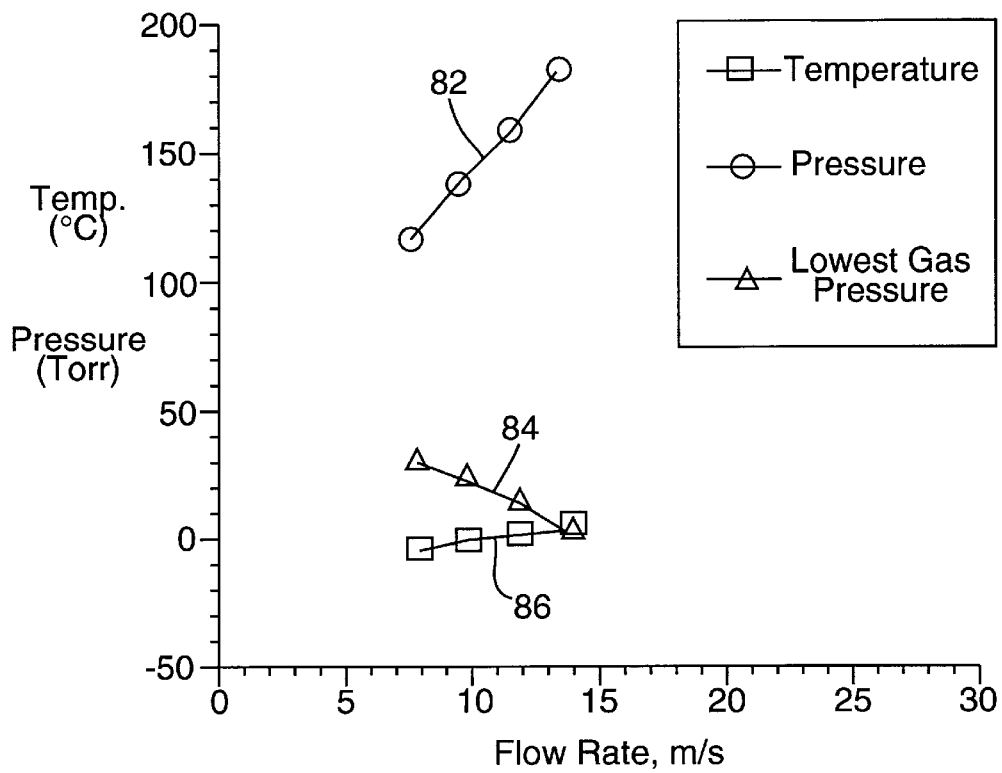
FIG. 9 is a diagrammatic illustration showing the relationship between the fuel flow rate versus, the evaporator temperature, and the evaporator and condenser pressures for a closed loop fuel system of the CW PIL of FIG. 1.

The first case is the CW PIL of the present invention with a low friction orifice plate (K=500 versus Textron's K=4500), a 45 Torr, long 100 cm gain cell obstruction and a maximum flow rate of 10 m/s with a −38° C. condenser, the results are plotted in FIG. 7, where curve 74 is fuel pressure in Torr and curve 76 is fuel temperature in ° C. The next case is the same system with a 45 Torr, long 20 cm (new) gain cell obstruction and a maximum flow rate with a −38° C. condenser of 24 m/s, shown in FIG. 8, where curve 78 is fuel pressure in Torr, and curve 80 is fuel temperature in ° C. Both 30 and 45 Torr systems were studied. Systems with 20 Torr or lower were not studied because of the larger flow requirements making cooling requirements of the condensers and heat exchangers prohibitive from manufacturing and cost aspects For the case of high pressure in the gain cell, using the −38° C. condenser, lower cooling requirements resulted (7–18,000 Btu/hr for 10–24 m/s flow, respectively). See FIGS. 9 and 10. Referring specifically to FIG. 9, curve 82 illustrates the evaporator pressure, curve 84 illustrates the pressure before the condenser in torr, and curve 86 illustrates evaporator temperature in ° C. for a 100 cm gain cell and an orifice plate having a conductance of 500.

Figure 10:
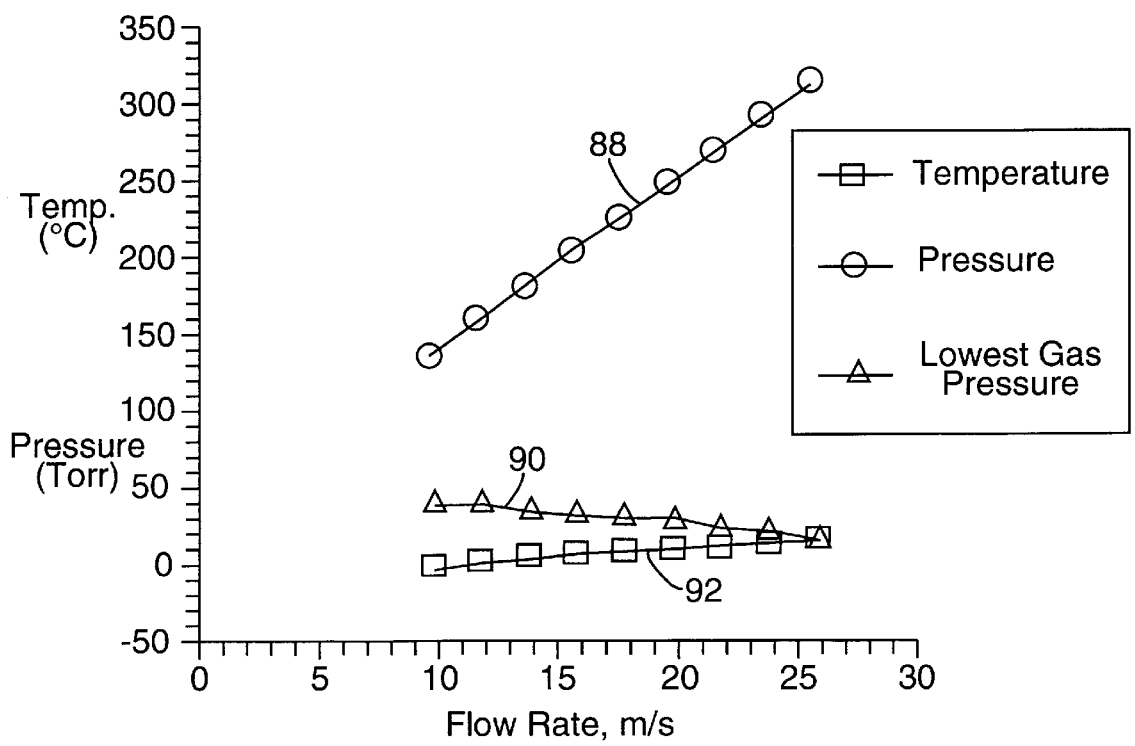
FIG. 10 is a diagrammatic illustration showing the relationship between the fuel flow rate versus, the evaporator temperature, and the evaporator and condenser pressures for a closed loop fuel system of the CW PIL of FIG. 1.

Referring to FIG. 10 curve 88 illustrates the evaporator pressure, curve 90 illustrates the pressure before the condenser in torr, and curve 92 illustrates evaporator temperature in ° C. for a 20 cm gain cell and an orifice plate having a conductance of 500.

Comparison between FIGS. 9 and 10 shows that the maximum flow rate increases by approximately 70% (from 14–24 m/s) when the length of the high friction gain cell obstruction is reduced from 100 to 20 cm.

Figure 11:
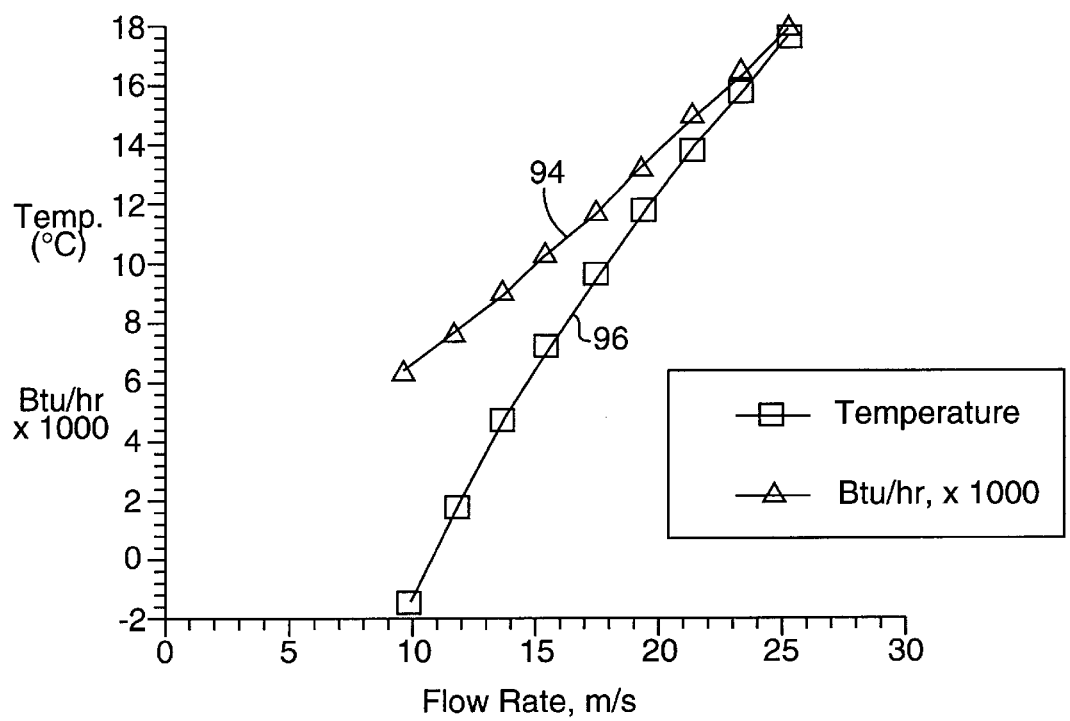
FIG. 11 is a diagrammatic illustration showing the relationship between the fuel flow rate versus evaporator temperature, and the heat removed by the evaporator for a closed loop fuel system of the CW PIL of FIG. 1.

The resulting heat capacity requirement curve, which is essentially the same for both the 100 and 20 cm. gain length is shown in FIG. 11 where curve 94 illustrates the heat capacity in BTU/hr×1000, and curve 96 illustrates the temperature in ° C.

For the case of lower 30 Torr pressure in the gain cell, using the −38° C. condenser, excessive cooling requirements resulted (17–28,000 Btu/hr for 10–16 m/s flow, respectively). This is a result of the widening of the UV pumping region to 2 in. (for two opposing UV lamps transverse to the flow) from the 1 inch width at 45 Torr. This doubling of the UV pumping width almost doubles the fuel system mass flow rate for a given flow velocity in the gain.

Figure 12:
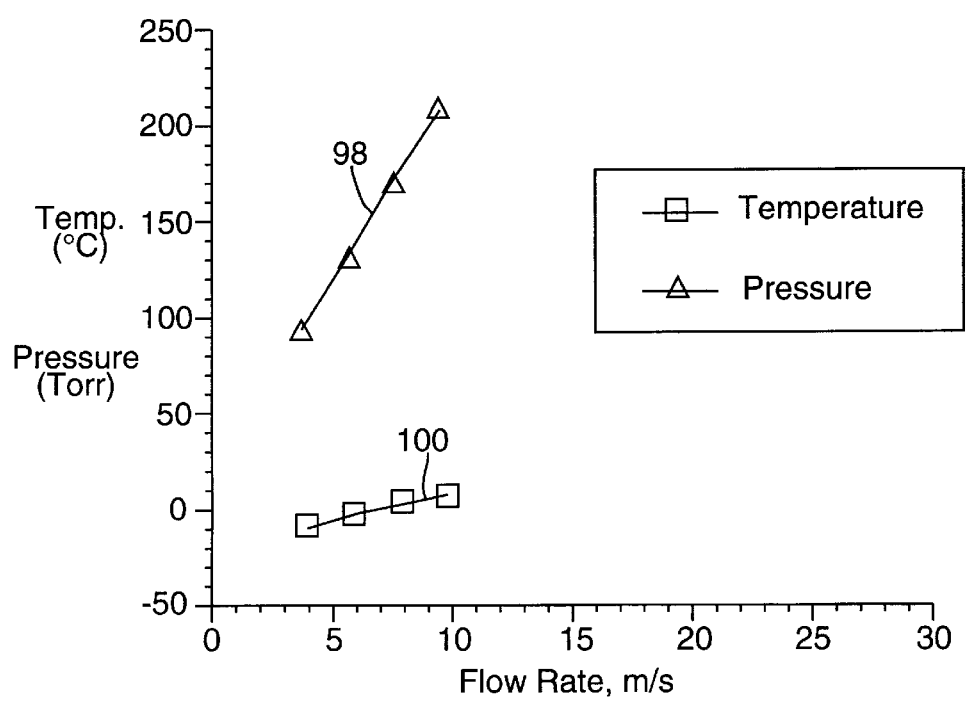
FIG. 12 is a diagrammatic illustration showing the relationship between the fuel flow rate versus temperature, and pressure for a closed loop fuel system having an orifice plate of the CW PIL of FIG. 1.
Figure 13:
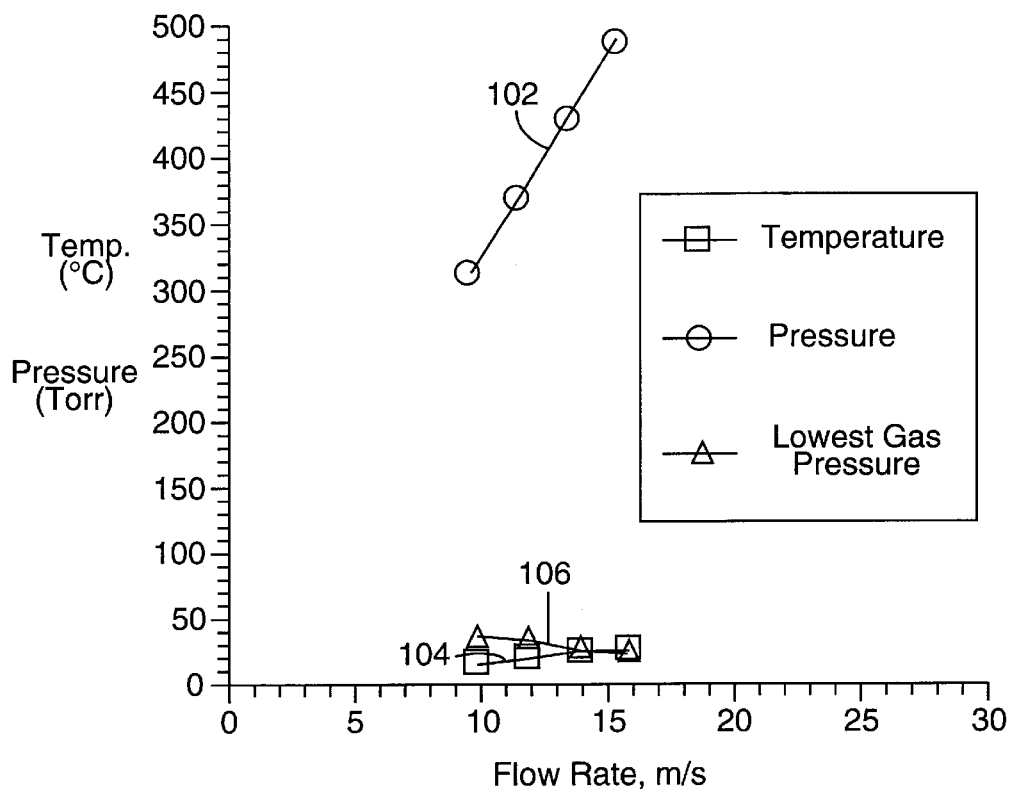
FIG. 13 is diagrammatic illustration showing the relationship between the fuel flow rate versus the evaporator pressure, the lowest gas pressure, and the evaporate temperature for a closed loop fuel system of the CW PIL of FIG. 1.

FIGS. 12 and 13 illustrate the flow rates for given evaporator pressures for systems having a 100 cm long gain cell and the new 20 cm long gain cell, respectively. Referring to FIG. 12, curve 98 illustrates evaporator pressure, and curve 100 illustrates evaporator temperature. Referring to FIG. 13, curve 102 illustrates evaporator pressure, curve 104 illustrates evaporator temperature, and curve 106 illustrates the lowest gas pressure in the closed loop fuel system.

Comparison between FIGS. 12 and 13 shows that the maximum flow rate increases by approximately 60% (from 10–16 m/s) when the length of the high friction gain cell obstruction is reduced from 100 to 20 cm. What was expected to make only marginal increase in flow rate, decreasing the restricted narrow portion of the transverse flow gain area from 100 to 20 cm, resulted in approximately doubling of the flow through the gain. This is with no other changes in hardware, tubing sizes, etc. Accordingly, doubling the flow also doubles the mass flow rate which must be handled by the condenser and evaporator.

The heat removal curves (condenser) and evaporator temperatures for the case at 30 Torr in the gain region are given below in FIGS. 14 and 15 for old (20 cm) and new (100 cm) long gain cells, respectively.

Figure 14:
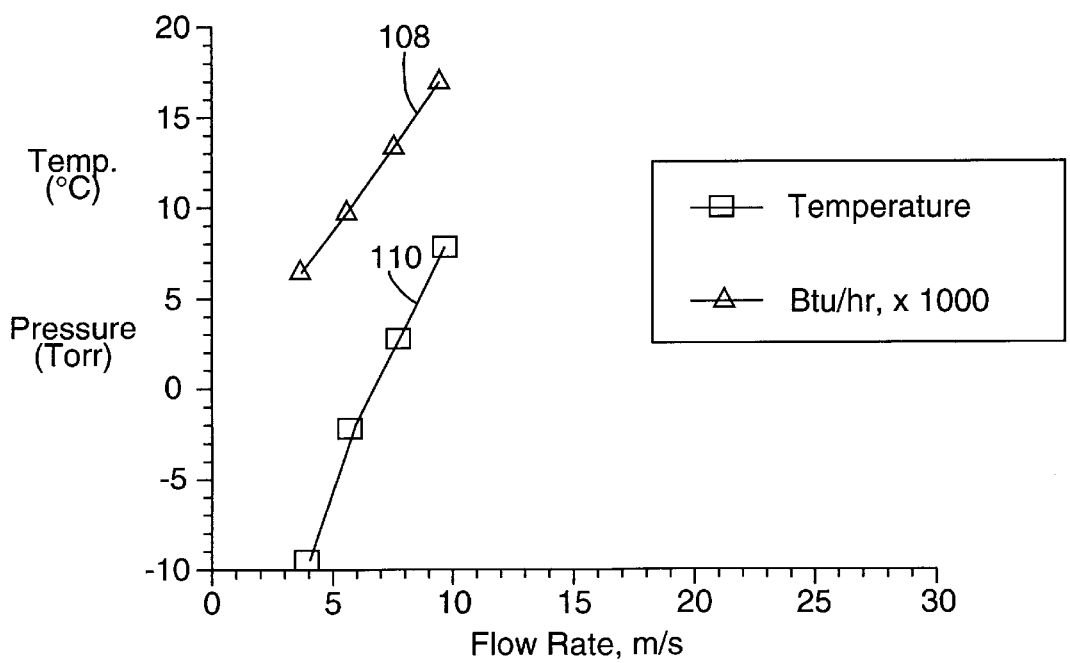
FIG. 14 is a diagrammatic illustration showing the relationship between the fuel flow rate versus evaporator temperature, and the heat removed by the evaporator for a closed loop fuel system having an orifice plate of the CW PIL of FIG. 1.
Figure 15:
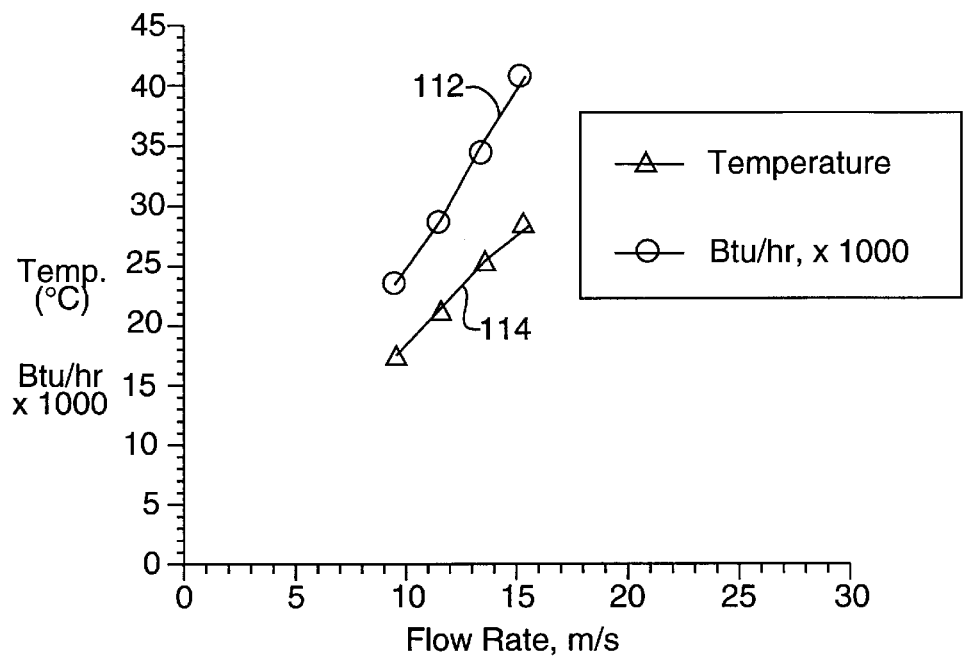
FIG. 15 is a diagrammatic illustration showing the relationship between the fuel flow rate versus evaporator temperature, and the heat removed by the evaporator for a closed loop fuel system having an orifice plate of the CW PIL of FIG. 1.

Curve 108 in FIG. 14 illustrates the heat removed by the evaporator, and curve 110 illustrates the evaporator temperature for a 20 cm gain cell. Similarly, curve 112 in FIG. 15 illustrates the heat removed by the evaporator, and curve 114 illustrates the evaporator temperature for a 100 cm gain cell.

Referring again to FIG. 1, the CW PIL of the present invention is comprised of a gain cell 12, an optical subsystem 14 communicates with the gain cell, a closed loop fuel system 18, and a pair of microwave subsystems 16, 17 (one shown) are also in communication with the gain cell.

Figure 2A:
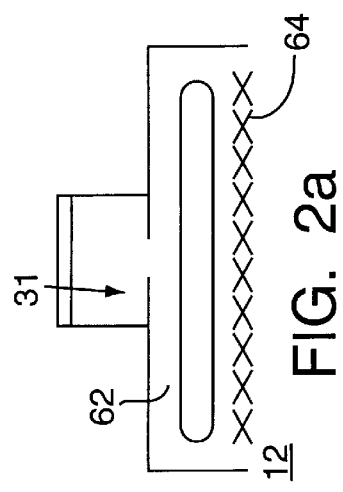
FIG. 2a is a simplified schematic illustration of the microwave cavity of the CW PIL of FIG. 1.
Figure 18:
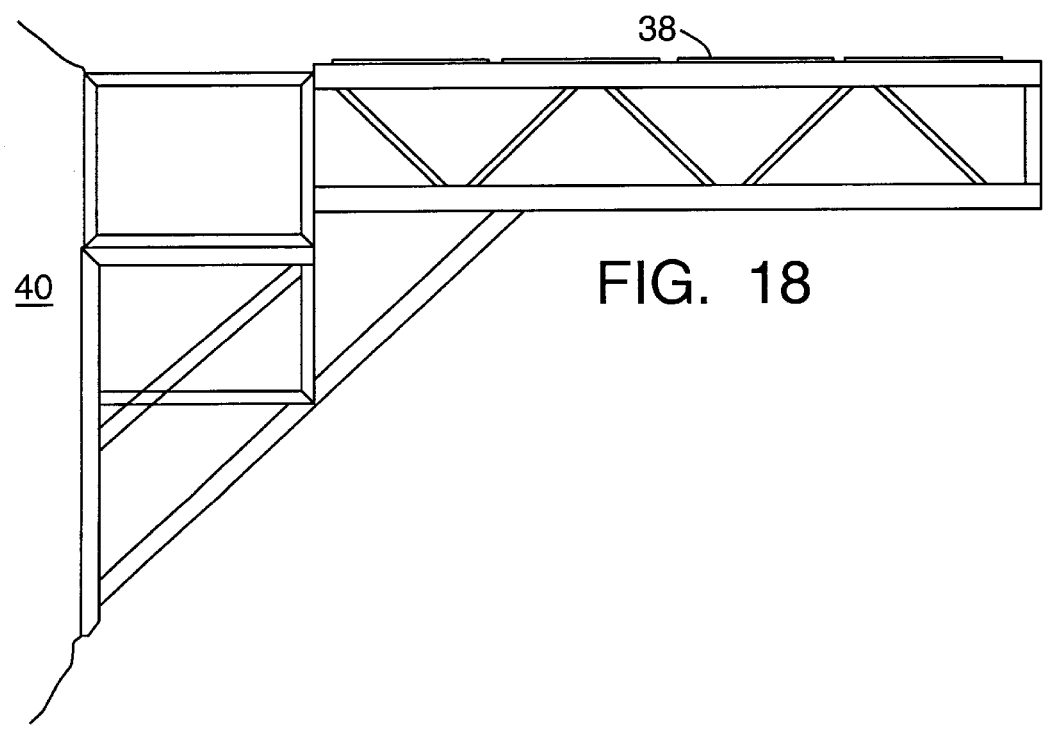
FIG. 18 is a side elevation of the swing arm of the CW PIL of FIG. 1.

Referring to FIG. 2, the laser's microwave subsystems 16 drive the UV emitting plasma lamps 14, best seen in FIG. 3. The lamps 14 are attached to the gain cell 12 such that as they are energized by the microwave subsystems 16, 17, the lamps 14 optically pump the laser's gain medium. Referring back to FIG. 2, the microwave subsystem 16, 17 employs very high powered magnetrons 22. A single magnetron 22 is capable of driving more than one UV lamp 14. The means by which this is accomplished will be explained in greater detail below. Using a single magnetron 22 greatly simplifies the microwave systems' 16 electronics, power supply and waveguide requirements. The UV lamps are filled with a gas 13 such as excimer gases or halogen gases which are chosen to match as closely as possible the absorption band of different CW PIL gain mediums, such as, fluoroiodide alkanes, to give greatly increased laser output power and performance. The magnetron 22 is attached to a launcher 24, and the launcher is attached to a circulator 25. the circulator 25 is placed in the microwave subsystem to block reflected power and to prevent accidental destruction of the magnetron 22 in the case of a lamp failure. A tuner 28 is attached to the circulator 25 thereby allowing tuning of the microwave resonant cavities 30 and 32. Wave guide 34 is interposed and coupled to the tuner 28 and tee 31. Tee 31 is coupled to the resonant cavities 30 and 32, thereby splitting the microwave power generated by the system to the two lamps 14, 14 and allowing more than one lamp to be driven by a single magnetron 22. The tee 31 and waveguide 34 provide the microwave pump radiation to the plurality of UV lamps 14. The tee 31 in the present invention can be a hybrid (dB reducing) or "magic" tee to insure proper splits of forward traveling microwave power and reduction of reflected or backwards traveling microwave power by routing such power to a water cooled load or other power dump The lamps 14 on each side of the gain cell 12, shown in FIG. 3, are on one focus of a half cylindrical microwave cavity 62 with elliptical cross section, shown in FIG. 2a. The cavity 62 communicates with the tee 31. A microwave-retaining screen 64 is positioned across the cavity 62. The microwave power generated by the microwave subsystem 18, is pumped into the UV lamps 14 which subsequently send UV radiation outwardly, substantially perpendicular to the UV lamps 14. This UV radiation is aimed into the gain cell 12. During operation, the lamps 14 are cooled in their axial directions via air flowing through the cavity 62. Adding lamps 14 in the flow direction, supplies additional laser gain to the system. The microwave subsystems 16, 17 are supported by a swing arm assembly 38, shown in FIG. 18, hingedly attached to a support structure 40 such that, the microwave subsystem 16, 17 can swing away from the rest of the laser, thereby providing greater access to the microwave and lamp assemblies for service and maintenance.

The closed loop fuel system 18 shown in FIGS. 1 and 5 is designed such that maximum power extraction is realized within the laser's gain cell 12 by providing very high gaseous fuel flow rates. The closed loop fuel system 18 is designed for high flow rate/low friction operation. The physical features of the closed loop fuel system were determined using the previously described computer models. The CW PIL of the present invention operates in a regime of higher molecular weight gases, extremes of cold temperatures, and at flow rates far higher than existing systems operate. Thus, the design of the closed loop fuel system is a direct result of exercising the specially built model to handle these very unusual gas flow conditions. Running the kinetics model using optimal hardware dimensions, configurations, and features to optimize the frictional/flow characteristics resulted in several required important features absolutely necessary for very high flow operation.

Additionally, the kinetics model showed that operation at much higher pressures in a CW PIL laser, than previously demonstrated, provides more pumped iodine atoms (for lasing) but, this requires much higher flow rates to push the gain-quenching lasing by-products out of the gain region.

Based on the foregoing, the closed loop fuel system comprises a fuel inlet 42 in communication with the gain cell 12 for receiving and presenting gaseous fuel to the gain cell. The feed inlet 12 of the preferred embodiment consists of a 6 inch diameter tube. By using large diameter tubing, the losses due to the friction of the high molecular weight fuel, namely, $C_3F_7I$, are minimized. In order to further reduce frictional losses, a diffuser 44 is coupled at its wide end to the feed inlet, and at its narrow end to the fuel delivery conduit 45, thereby, providing a smooth, low friction transition from the fuel delivery conduit 45 to the feed inlet 42. It is important that the frictional losses be minimized such that the maximum possible fuel flow rate, without the aid of a blower, can be delivered to the gain cell 12.

Still referring to FIG. 5, after the gaseous fuel passes through the gain cell 12, it enters post cooler 22 where the fuels temperature is lowered prior to entering the condenser 28. By employing a post cooler 22, the size and power requirements of the condenser can be reduced. The gaseous fuel flows out of the post cooler 22 and into the condenser 28 where the fuel is converted from a gas to a liquid. As previously explained, the optimal operating temperature of the condenser 28 is −38° C. Operation at this temperature as opposed to the more traditional condenser temperatures of −60 to −70° C. allows for the use of a more economical condenser. Since the gaseous fuel flows from the gain cell 12 immediately into the post-cooler 22, and the condenser 28 a rapid aerodynamic expansion takes place. This is due to the fact that the gas flows into the condenser 28, rather than into a tube or channel leading to the condenser 28. The liquefied fuel passes out of the condenser 28 to scrubber 27. The purpose of the scrubber 27 is to remove the gain-quenching lasing by-product, $I_2$. Since $I_2$ reacts with copper (in one scrubber configuration) to form a precipitate, the scrubber 27 is packed with copper. However, the scrubber 27 is not limited in this regard. The scrubber 27 can be any system which reacts with, precipitates, absorbs, or adsorbs iodine. Molecular sieves have exhibited excellent $I_2$ removal performance and life in industrial PIL systems. The molecular sieve also removes any oil contaminant and some $O_2$ and $H_2O$ (which reduces the PIL's gain). Since the kinetic rate for this reaction doubles for every ten degrees of temperature increase, the liquid going into the scrubber is heated by heater 33 after exiting the condenser 28 to insure fast and complete reaction with the iodine scrubber materials. After the by-products of the lasing process are removed by the scrubber 27, the purified liquid fuel is transferred to evaporator 26 where it is converted from a liquid, back to a gas thereby causing a significant increase in pressure which facilitates the transportation of the gaseous fuel through the closed loop fuel system 18. It was found during the computer modeling and simulations, that the temperature range of the evaporator 26, should be in the range of 0 to 16 C. Interposed between the condenser 28 and the scrubber 27 between ,and the scrubber 27 and the evaporator 26 is the liquid fuel transport conduit 48. The liquid fuel transport conduit 48 has an inner diameter that is larger than 0.5 in. This was determined by running simulations on the aforementioned computer models Liquid fuel transport conduits in this size range were determined to be optimal in minimizing friction and thereby pressure losses. In the liquid phase section of the closed loop fuel system, a gear pump 29 is used to increase system pressure to offset any frictional losses. The gear pump's pressure enhancement, when placed in a strategic location, can result in 25–50% increases in the overall system fuel flow rate. Similarly, placement of the system's condenser 28 and post-cooler 22 immediately following the gain cell exit 43 also greatly reduces the frictional gas flow losses, giving increased system gas flow velocities.

After the fuel passes through the evaporator 26, it is presented to orifice plate 46. The orifice plate 46 has a series of apertures extending through it as shown in FIG. 5a. The orifice plate 46 has a conductivity K=500. While an orifice plate is shown, the invention is not limited in this regard any means such as, a valve, or other obstruction known to those skilled in the art may be substituted without departing from the broader aspects of the invention. The orifice plate 46 is interposed between, and coupled to, the diffuser 44 small end and the conduit 50. As described in detail above, the closed loop fuel system 18 of the present invention, due to the attention paid to minimizing losses, and the placement of the various components is able to operate at significant fuel flow rates, and pressures, without the need for a blower.

Still referring to FIG. 5, and in an alternate embodiment, the closed loop fuel system includes a post-cooler 22 interposed between the gain cell 12 and the condenser 28. The post-cooler reduces the temperature of the spent fuel after it has passed through the gain cell 12, prior to the fuel's entering the condenser 28, thereby reducing the power requirements of the condenser 28. A pre-heater 24 is interposed between the orifice plate 46 and the evaporator 26 for heating the gaseous fuel after it passes out of the evaporator 26 thereby reducing the power requirements of the evaporator 26. Pressure sensor 52 shown in FIG. 5, is positioned after the orifice plate 46 with regard to the direction of flow "F". Pressure sensor 54 is positioned between the post-cooler 22 and the condenser 28. Pressure sensor 55 is positioned between the evaporator 26 and the pre-heater 24. Valves 56, 56 are positioned, with respect to the flow direction "F", after the post-cooler 22, and before the pre-heater 24.

Referring to FIGS. 3 and 6, because of the high molecular weight gases used for fuel, and the high fuel flow rates, a long rectangular gain cell 12 design carrying multiple lamps 14 along the optical axis 15 can handle approximately the same flow rate as a gain cell with single lamps in the optical axis direction. Thus, twice or higher multiples of lamps 14 can be added to the laser's gain excitation region with minimal loss of gas flow as the gain cell rectangle length increases. The flow model predicts that the determining dimension is "t", the width of the rectangular gain cell 12, and not the overall length. Thus, a long gain cell with multiple lamps will support approximately as high a flow rate as a short one. UV lamp windows 58 are mounted flushly to the gain cell 12 such that flow friction is minimized. The UV lamp windows 58 communicate with the gain cell 12 to input UV radiation to the gain cell 12. Laser windows 60, for inputting the resonator beam are carried by the gain cell 12, best seen in FIG. 6.

In an alternative design multiple UV lamps 14 and microwave cavities can be employed to double the laser gain. Still more pumping power can be achieved by adding more ellipses. The ellipses foci in the gain region must all lie essentially in a horizontal line (coincidental or near-coincidental foci) so the effect of increased pumping is not quenched by laser by-products. At very high flow rates, the kinetics model showed that molecular iodine (I2) concentrations, a by-product of the lasing process which can quench the process if sufficient quantities accumulate, are low enough that two or more microwave pumping regions in the gas flow direction will give almost two more times the gain for two or more times output laser power. Whereas at lower gas flow rates, the kinetics model predicts, and experiments have shown, that iodine concentrations level preclude any lasing downstream of the initial laser gain.

Referring back to FIG. 6 The optical system is comprised of a laser resonator 66 along with beam transfer optics 32, 32 to shape the laser beam to the appropriate size, and to get the beam out of the CW PIL 10 in FIG. 1. The resonator 66 is an unstable imaging resonator which provides a flat laser beam phase and intensity at the exit of the laser resonator. This configuration requires a rectangular beam cross section for good transverse mode control.

Figure 16:
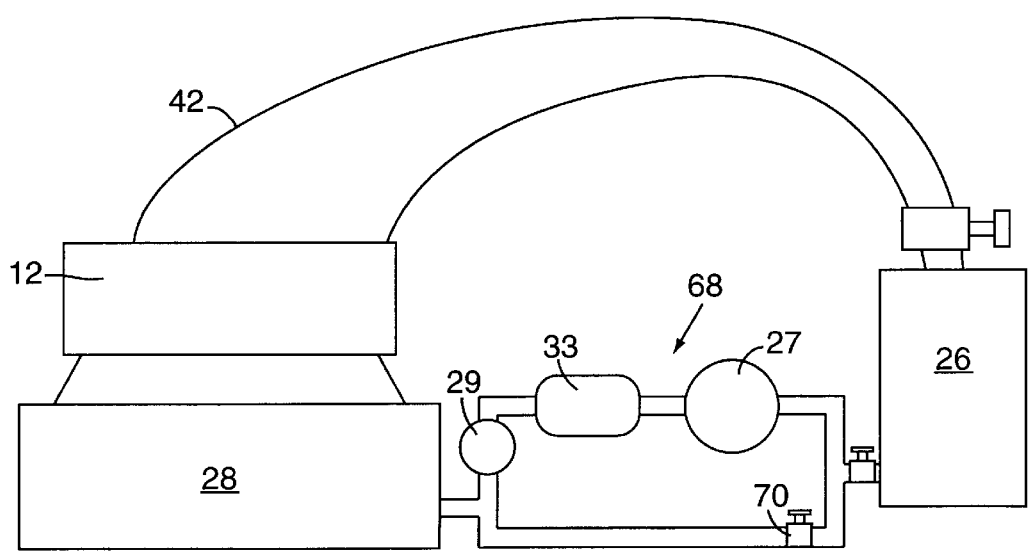
FIG. 16 is simplified schematic illustration showing an alternate embodiment of the closed loop fuel system of the CW PIL of FIG. 1 having a liquid fuel recycling loop.

Referring to FIG. 16, an optional fuel flow loop 68 is shown. The purpose of the optional liquid fuel flow loop 68 is two-fold. The first is that this loop can be used as a bypass whenever a gear pump 29 is used. The second is that valves 70 can be set so that most of the liquefied fuel can circulate within the loop 68 for multiple passes through the scrubber 27. Thus the liquefied fuel can pass through the system in a straight through configuration, or using an optional by-pass configuration the amount of exposure time to the iodine scrubber material can be increased.

Figure 17:
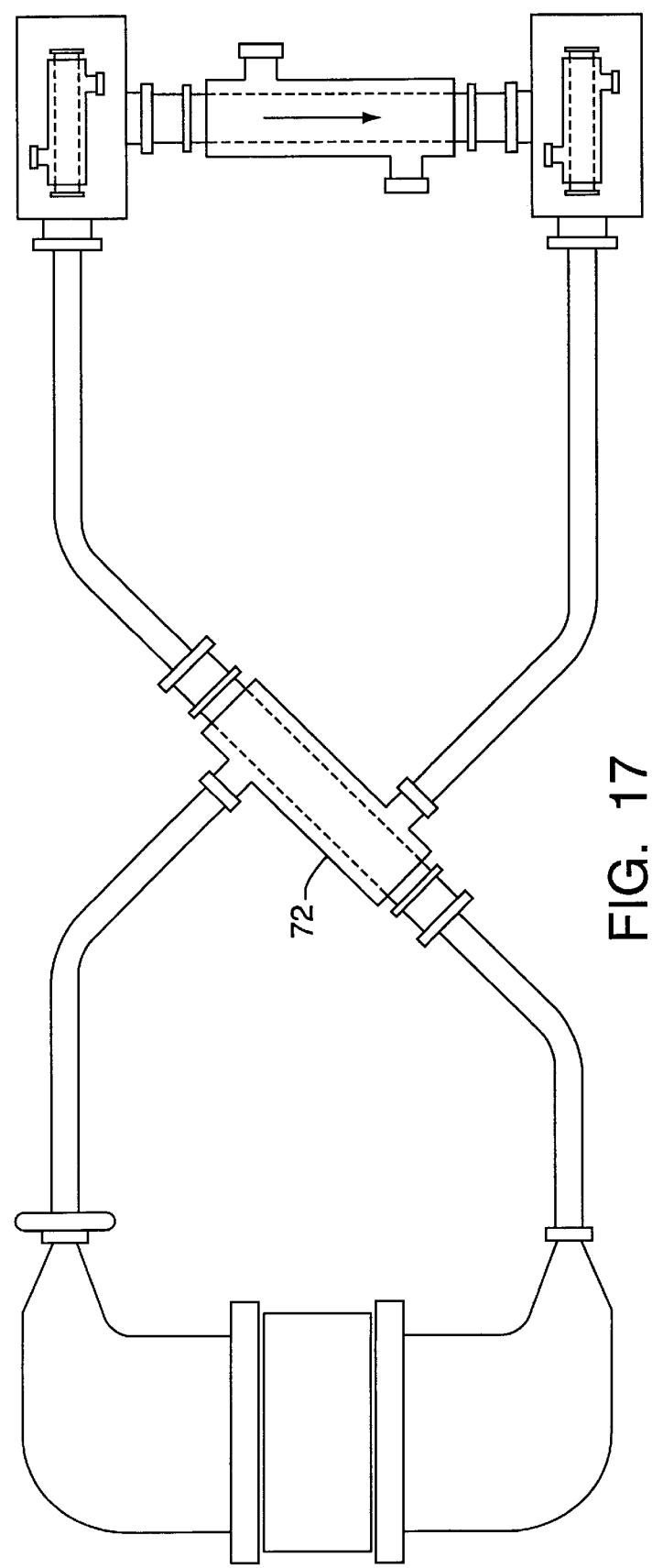
FIG. 17 is a simplified schematic of an alternate embodiment of the closed loop fuel system of the CW PIL of FIG. 1.

In another embodiment, shown in FIG. 17, the post cooler 22 and the pre-heater 24 are replaced by a single cross flow heat exchanger 72.

In still another embodiment of the present invention, the heater 33, as well as the condenser 28 and the evaporator 26, utilize excess heat or coolant from other processes within the CW PIL to cool or heal the laser's fuel. For example, excess heat from the magnetron 22, shown in FIG. 2 can be used to supply the heater 33 with energy.

In yet another alternate embodiment, the condenser is operated in a "dry sumps" configuration. The bottom of the condenser is slanted to a lowest central point with little or no reservoir thereby significantly reducing the amount of fuel needed to operate the CW PIL.

In a still further embodiment of the present invention, the fuel system, gain cell and resonator designs are applicable to photolytic iodine lasers of less than 100% duty cycle including Q-switched, pulsed, modulated, mode-locked or other modes of non-continuous wave operation.

In a still a further embodiment of the present invention, the fuel system, gain cell, and resonator designs are applicable to photolytic iodine lasers pumped by lamps driven by other sources of pumping power such as continues or pulsed discharge lamps, RF sources. The designs are also applicable to pumping of the PIL gain by direct means such as direct high powered diodes emitting radiation in the PIL's pumping absorbed wavelength.

Figure 20:
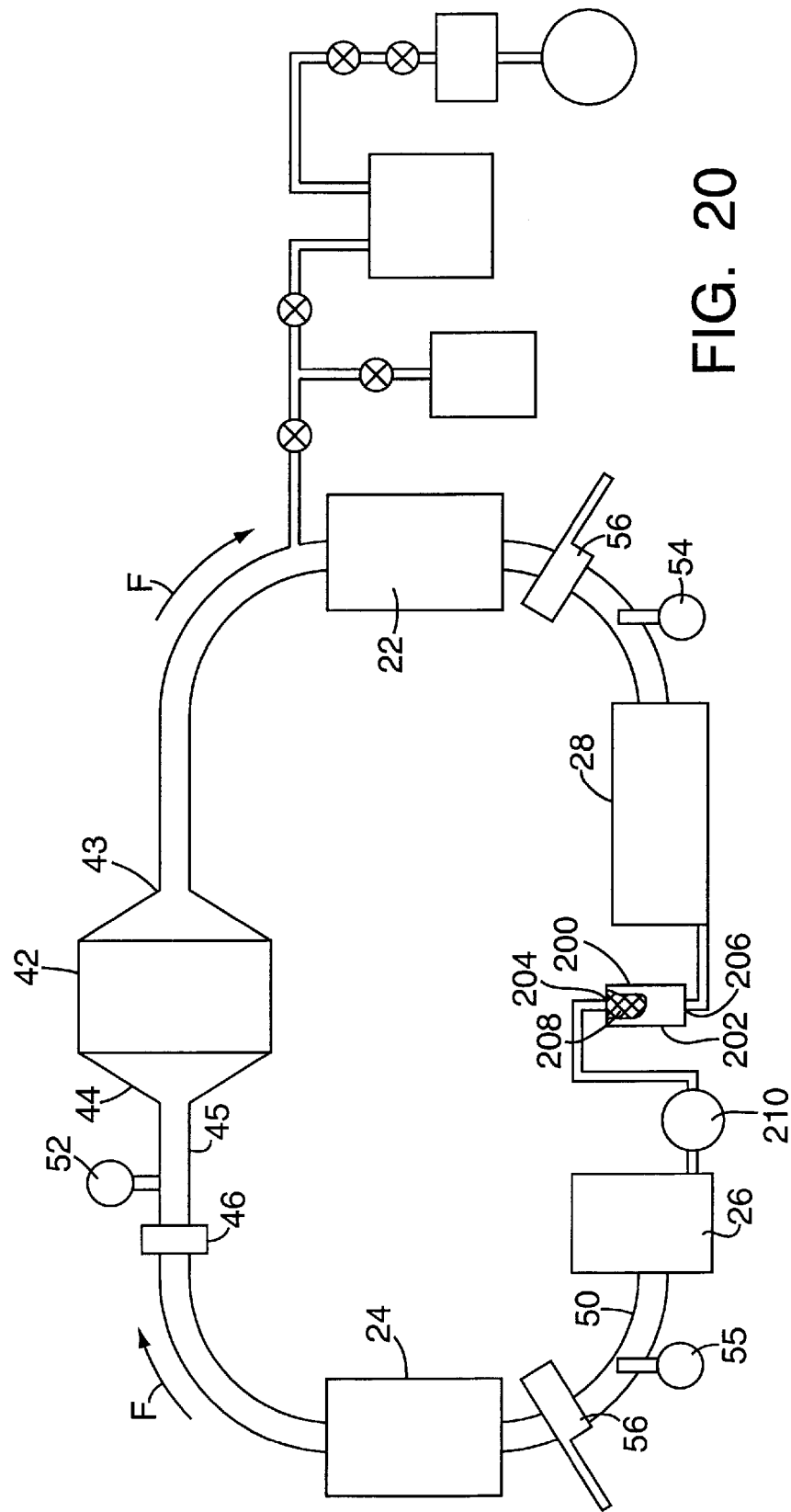
FIG. 20 is a simplified schematic of an alternate embodiment of the closed loop fuel system of the laser of FIG. 1.
Figure 21:
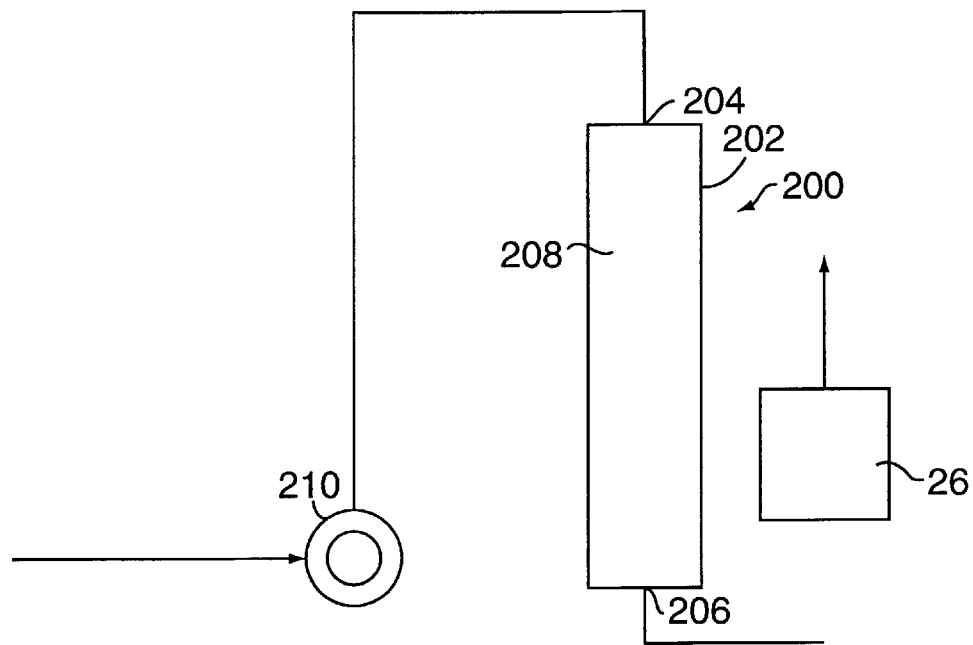
FIG. 21 is a partial simplified schematic of the laser of FIG. 20.

In yet another embodiment of the present invention, as best seen in FIGS. 20 and 21, instead of the previously described scrubber, the closed loop fuel system includes a molecular sieve bed 200, used to remove unwanted iodine ($I_2$) from the laser's fuel. The molecular sieve bed 200 consists of a hollow vacuum cylinder 202 fabricated from a suitable material, such as, but not limited to stainless steel, and includes vacuum flanges 204 and 206 that are connected respectively to opposed ends of the cylinder. The sieve material 208 is contained within the vacuum cylinder 202 and is composed of a suitable matrix material, such as but not limited to clay. The molecular sieve bed 200 is positioned between, and in fluid communication with the condenser and evaporator, 28 and 26 respectively. A gear pump 210 is also provided and is in fluid communication with the molecular sieve bed 200 and the condenser 28. As illustrated in FIG. 20, the gear pump 210 pumps the fuel from the condenser 26 into the top of the molecular sieve bed 200 where the fuel passes via gravity through the sieve 208 facilitating the removal of the aforementioned unwanted iodine.

Figure 23:
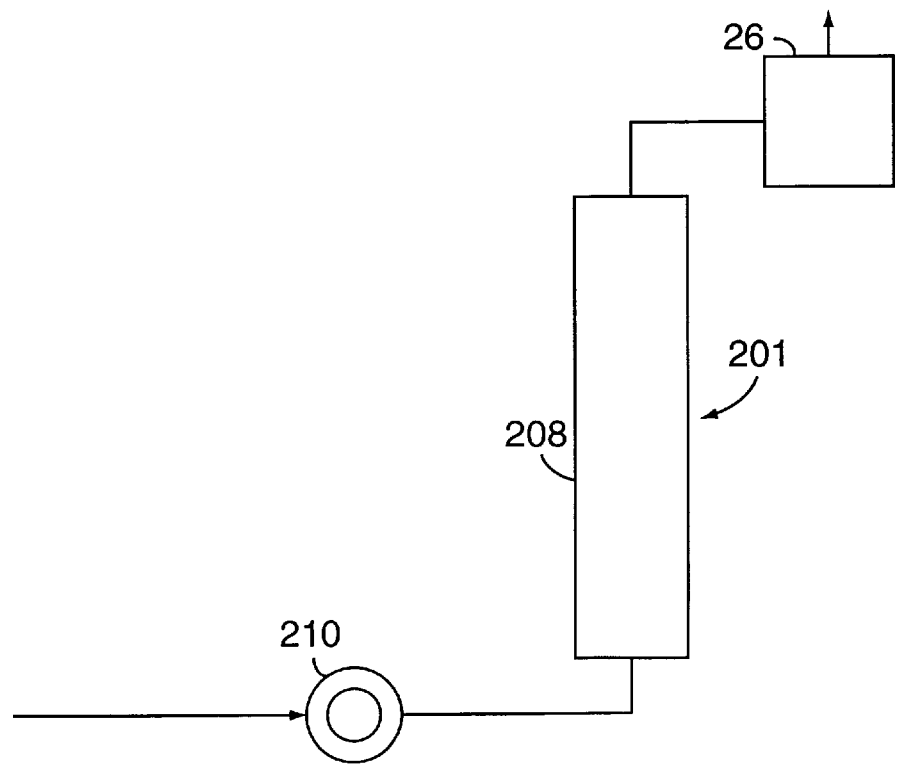
FIG. 23 is a partial simplified schematic of the laser of FIG. 22.
Figure 22:
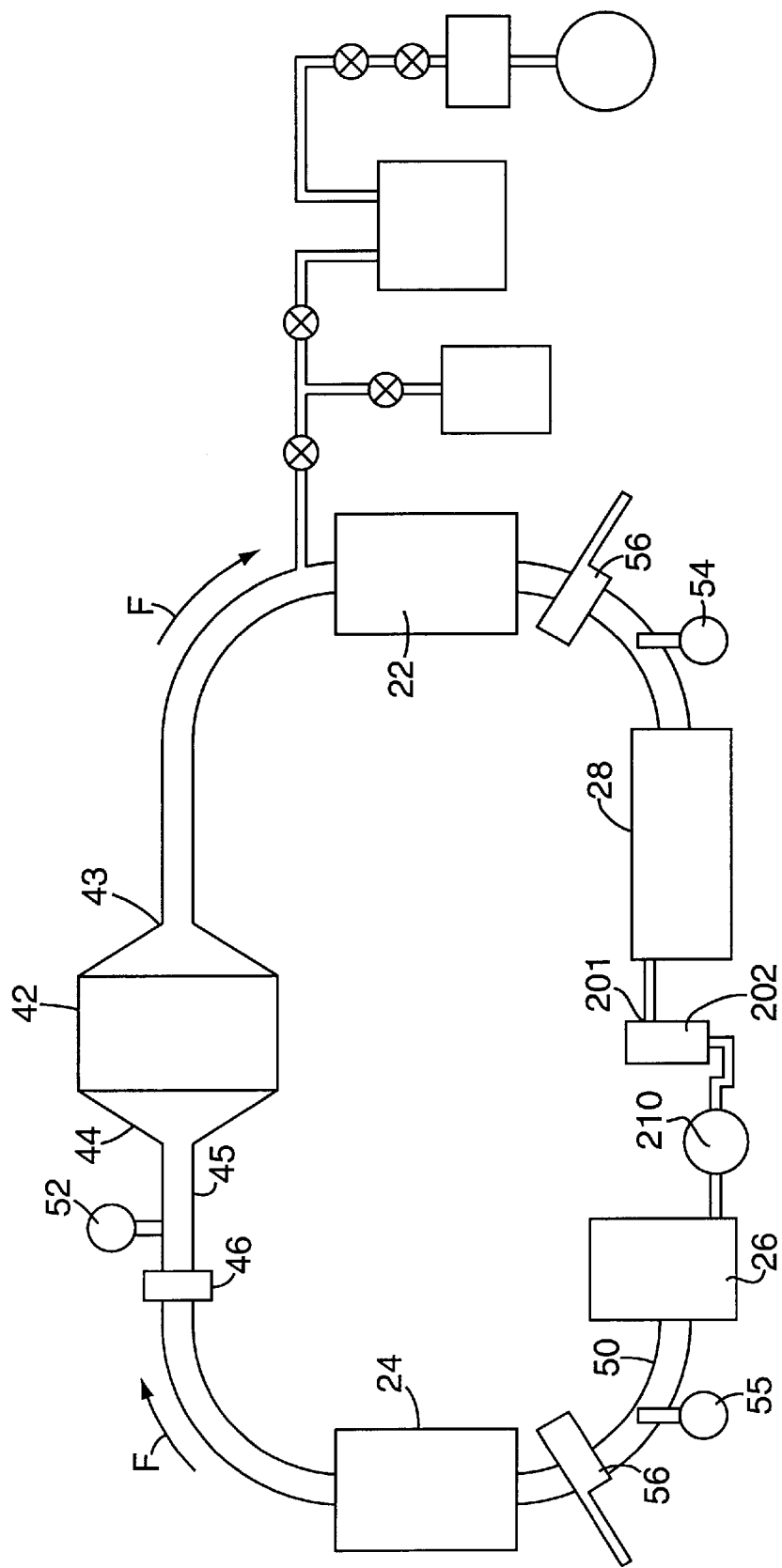
FIG. 22 is a simplified schematic of an alternate embodiment of the closed loop fuel system of the laser of FIG. 1.

Another embodiment of the molecular sieve bed, namely the pressure fed molecular sieve bed 201 is shown in FIGS. 22 and 23 as being fed from the bottom, however, the invention is not limited in this regard as the molecular sieve bed 201 can be operated in a horizontal or other orientation.

Figure 24:
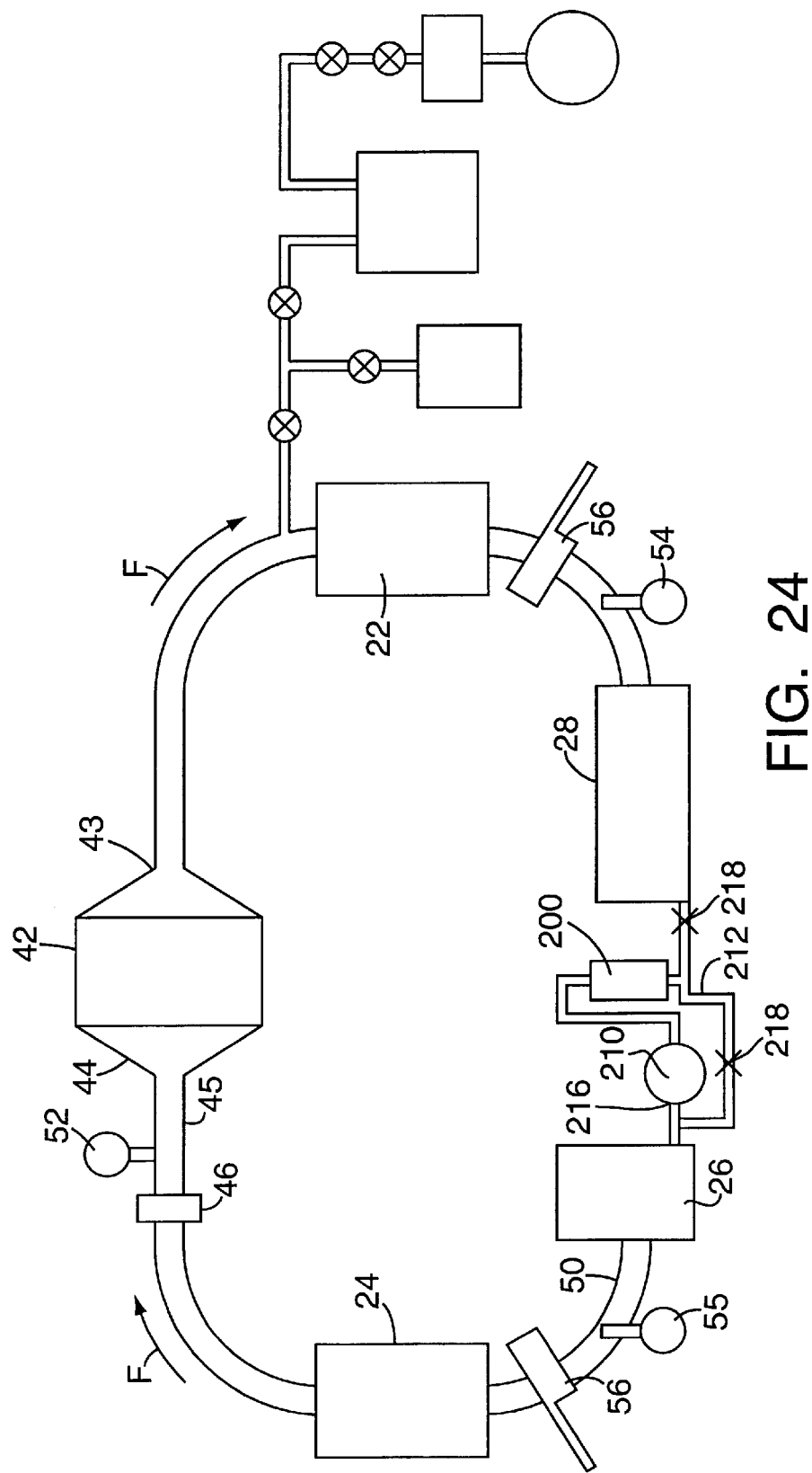
FIG. 24 is a simplified schematic of an alternate embodiment of the closed loop fuel system of the laser of FIG. 1.
Figure 25:
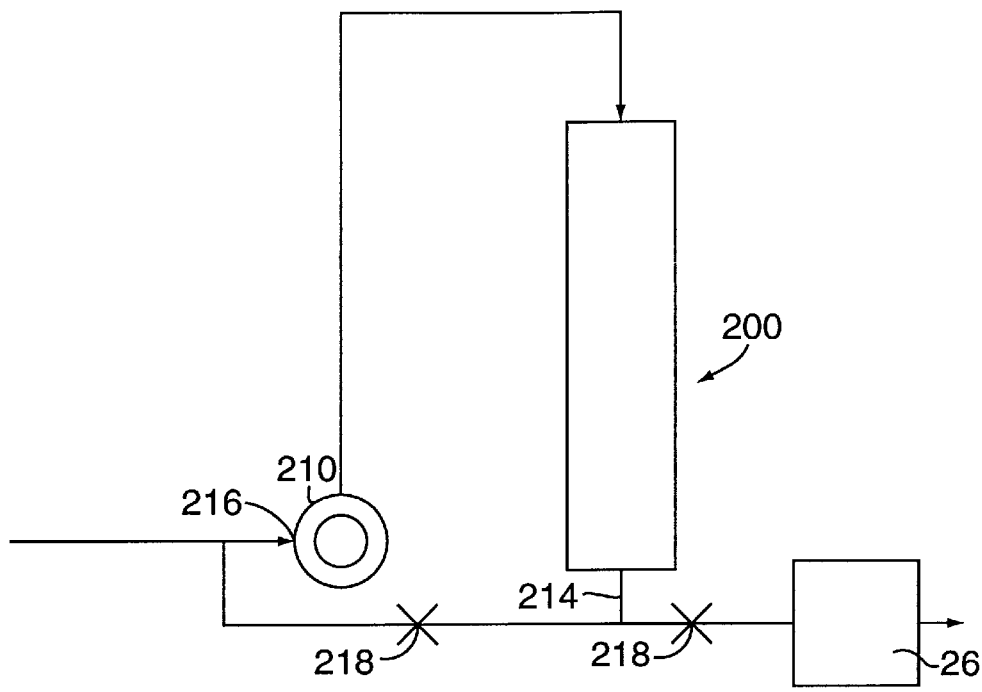
FIG. 25 is a partial simplified schematic of FIG. 24.

In still another embodiment, shown in FIGS. 24 and 25, a by-pass loop is provided in connection with either the pressure- or gravity-fed molecular sieve beds, 200 and 201 respectively. In this configuration, a portion of the fuel exiting the molecular sieve bed 200 can be returned for additional passes through the sieve 208 further clarifying the laser's fuel. This is accomplished by adding a return conduit between the molecular sieve bed exit 214 and the pump inlet 216. A pair of valves 218, 218 are provided, with one valve being interposed between the molecular sieve bed exit 214 and the pump inlet 216, and the other valve being located between the molecular sieve bed exit 214 and the evaporator 26. By throttling the valves 218, 218 the amount of fuel allowed to recycle back to the pump inlet can be selectively varied, thereby facilitating further iodine removal.

Figure 27:
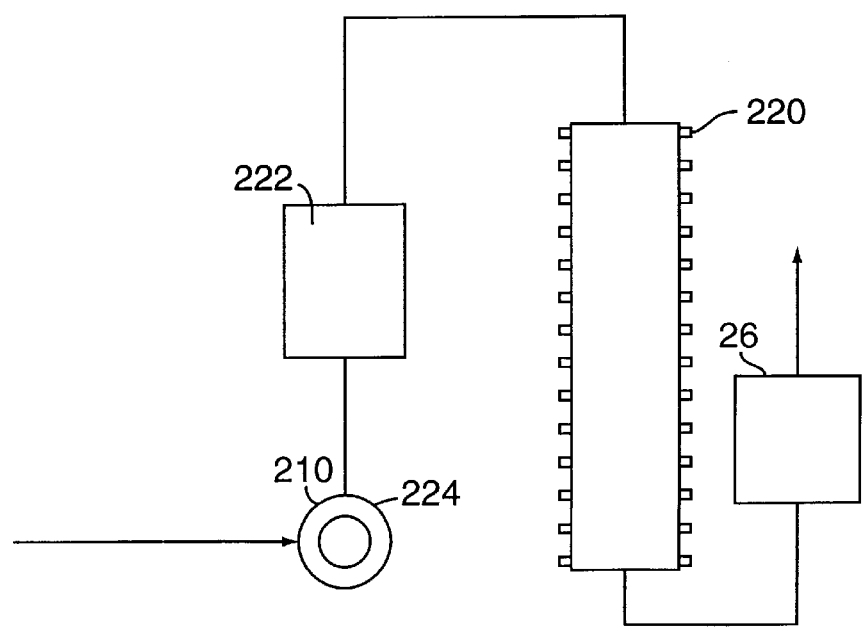
FIG. 27 is a partial simplified schematic of FIG. 26.
Figure 26:
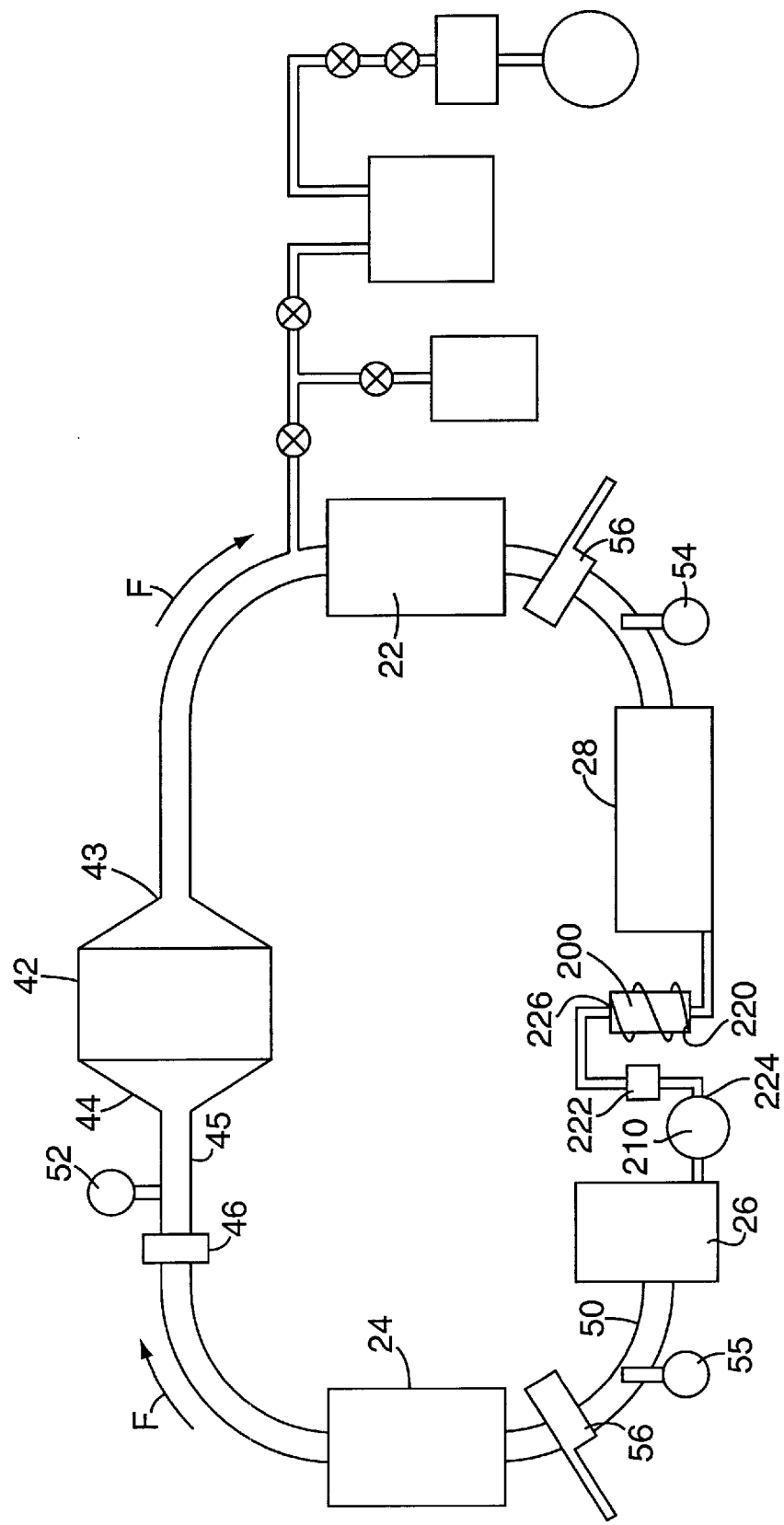
FIG. 26 is a simplified schematic of an alternate embodiment of the closed loop fuel system of the laser of FIG. 1.

The temperature at which the molecular sieve bed is operated affects its ability to capture the previously described unwanted iodine. As such, and as shown in FIGS. 26 and 27, a suitable external heat source 220, such as, but not limited to heat tapes, band heaters, or coils through which a fluid at the appropriate temperature is circulated, is provided in communication with the vacuum cylinder 202. Preferably the external heat source is operated to keep the sieve at a temperature between 30–40° F. thereby optimizing its ability to absorb iodine. An additional element important to the proper function of the molecular sieve bed 200 is a pre-heater 222, positioned between and in fluid communication with the gear pump outlet 224 and the molecular sieve bed inlet 226.

Figure 28:
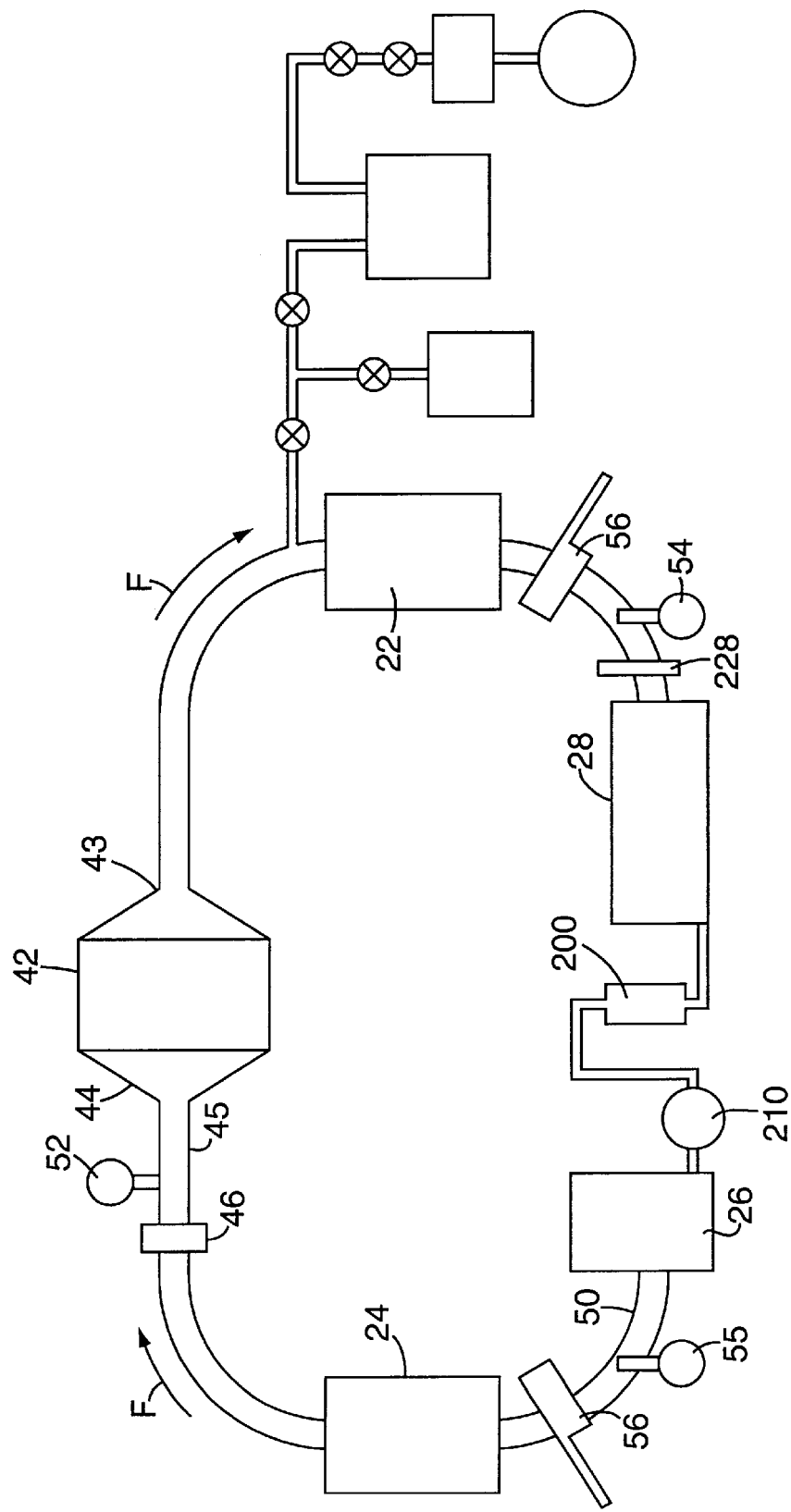
FIG. 28 is a simplified schematic of an alternate embodiment of the closed loop fuel system of the laser of FIG. 1.
Figure 29:
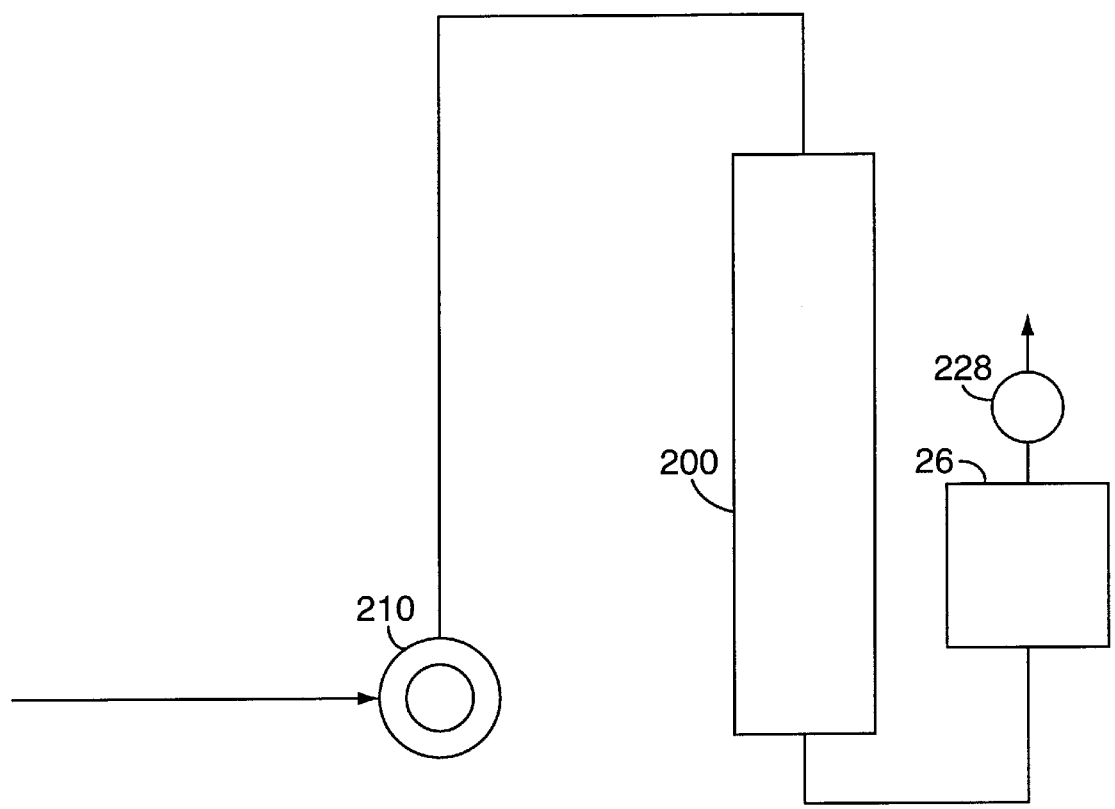
FIG. 29 is a simplified schematic of FIG. 28.

FIGS. 28 and 29 illustrate the use of an orifice plate 228 in connection with the above-described molecular sieve beds. The orifice plate is necessary in situations where the concentrations of unwanted iodine in the fuel, as well as the pressure in the closed loop system is low. In operation, the orifice plate 228 causes a restriction in the system which in turn causes the fuel pressure to increase. It is also possible to substitute a valve for the orifice plate. During extensive testing of the of the above industrial Photolytic Iodine Laser's (PIL's) circulating $C_3F_7I$ gas system, it was determined that several laser gain cells or modules could be operated using one gas flow and iodine ($I_2$) scrubbing system as long as the laser's refrigeration system, condenser, and evaporator were sufficiently large. When fabricating, assembling, and testing a system involving multiple laser gain modules for higher energy/higher power, a system having multiple gain modules per single gas flow system and single $I_2$ scrubbing system would be considerably simpler and cheaper due to reduction in numbers of components of the system. This would significantly reduce costs of manufacture operation, and maintenance, as well as increase the reliability of the system due to decreased numbers of operating components and reduced system complexity for a very high power/high energy system.

For higher repetition rates other than 'single-shot' operating conditions (duty cycles of less than 1 pulse/sec.), transverse flow systems are needed for the laser's gain modules. Due to the high modular weight of gases used in operating the PIL, e.g. $C_3FI$, $C_2F_5I$, $C_3F_7I$, $C_4F_9I$, etc., the gain modules, the associated gas flow tubing, fittings, valves, and other components must be designed for minimal friction and adequate gas flow rates. Module area dimensions of 3 in.$^2$ or transverse areas equivalent or larger are required to maintain gas flow rates in excess of 0.5 m/s. Fast axial flow gain modules are not suitable because of the high molecular weight of the gases used in PILS. Use of such a module would cause severe turbulence and density variations, detrimentally affecting the gain in such a system.

The PIL of the present invention has the unique capability of being able to scale powers and energies to very high levels with minimal or no degradation in beam quality. This has been demonstrated on a single shot basis (<1 Hz)—very high energies can be reached with pulsed photolytic iodine laser systems with good beam quality, good coherence, and generally acceptable operation. Pulse energy levels of the order of excess of 1000 J/pulse have been demonstrated in German government funded fusion research at the Asterix facility. However, this research dealt with longitudinal flow, single shot technology only.

A very high repetition rate system can be fabricated and operated generating very high energies, as described above, with high repetition rates. Rates of 100–200 Hz can be generated using the PILS gas flow and optical technology as described herein. The system of the present invention is scalable to very high energies and powers without degradation in operation or performance. The fact that the PIL of the present invention has one gas flow system that provides gas flow to a plurality of gain modules further adds to the scalability of the present invention.

The iodine laser's transmission through the atmosphere is excellent at 1.3 micron. There is minimal water absorption, turbulence and thermal blooming. In comparison with other higher energy and high power lasers, the propagation of the 1.3 micron radiation is excellent.

Because of the prototype industrial Photolytic Iodine Laser's oversized gas flow system, multiple gain modules can be supported using a single gas flow system, resulting in much larger laser systems with much higher output powers for the continuous wave laser system and much higher output energies for the pulsed laser system.

Because of the excellent beam quality of the output, high repetition PILS beams, the beam is suitable for imparting sufficient photon momentum to space debris to change their low earth orbits (LEO), resulting in eventual heating and destruction of the debris upon reentry into the earth's atmosphere. The high energy/high power PILS described herein provide all of the properties of a laser system for imparting sufficient photon momentum to space debris to shift their LEO orbits. Once shifted even slightly, they then have assume an unstable orbit, whereby upon multiple orbits of the earth, the debris begins to impact the atmosphere and heat up. Eventually, the high friction resulting from impacting the cause the debris to disintegrate.

Figure 30:
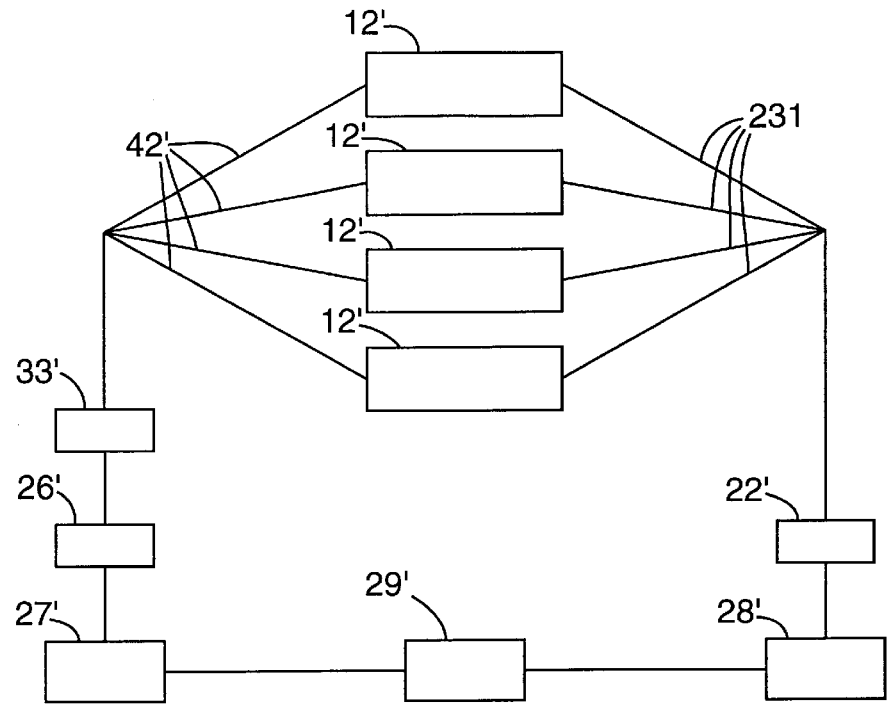
FIG. 30 is a simplified schematic of the laser of FIG. 1 showing multiple gain modules positioned in parallel relative to one another.

Multiple laser gain cells or modules 12' supplied by a single gas flow system can be configured in several different manners. For example, as shown in FIG. 30 a plurality of gain modules 12' are positioned in parallel relative to one another with the fuel inlets 42' of each gain module being in communication with an outlet from a preheater 33'. The preheater 33' accepts gaseous fuel from an evaporator 26', heats and presents the gaseous fuel to the fuel inlets 42' where it is split into a plurality of individual fuel streams.

Once the gaseous fuel enters one of the gain modules 12' it is excited to higher energy levels, by pumping with incident high power UV radiation. The UV radiation can be provided by several different devices, such as, plasma lamps, or other plasm sources driven by Rf, microwave discharge or other pumping energy sources or high power diodes. The excited gaseous fuel releases its energy content by lasing at optical frequencies, through the use of an oscillator or resenator (not shown). Upon passing through the plurality of gain modules 12', the fuel outlets through the fuel outlets 231, and the individual fuel streams are then combined and flow through a single line to a post cooler 22' and then on to a condenser 28'. A pump 29', such as, but not limited to a gear pump is interposed between the condenser 28' and the iodine scrubber 27' for pumping the fuel through the gain modules 12'. In this manner a single closed loop fuel system can supply gaseous fuel to a plurality of gain modules 12'. While FIG. 30 shows four gain modules 12' positioned in parallel relative to one another, the present invention is not limited in this regard as any number of parallel gain modules may be employed without departing from the broader aspects of the present invention.

Figure 31:
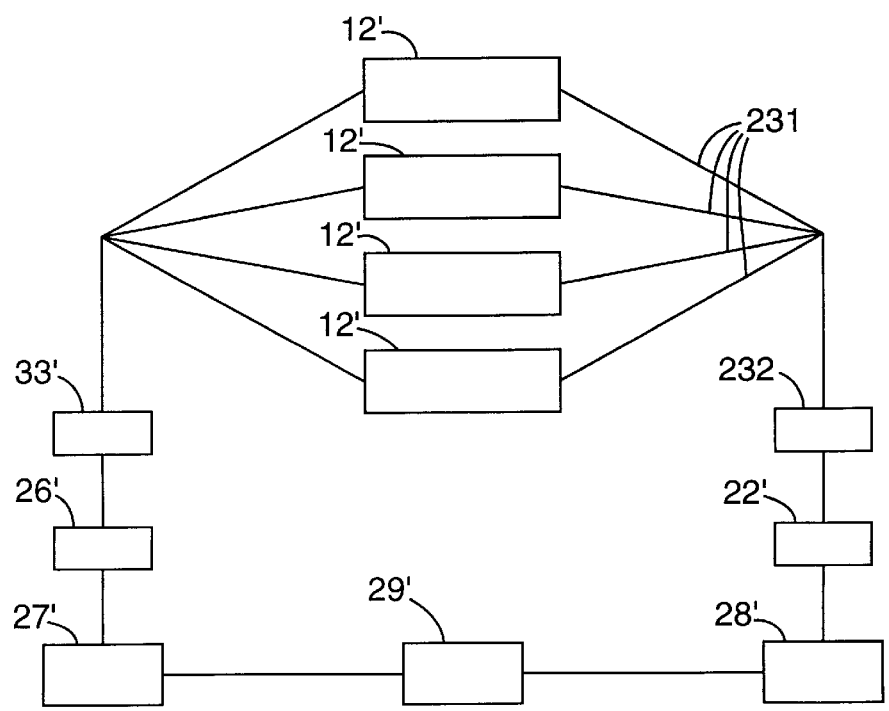
FIG. 31 is a simplified schematic of the laser of FIG. 30 showing a single heat exchanger coupled to the fuel outlets of the gain modules.
Figure 32:
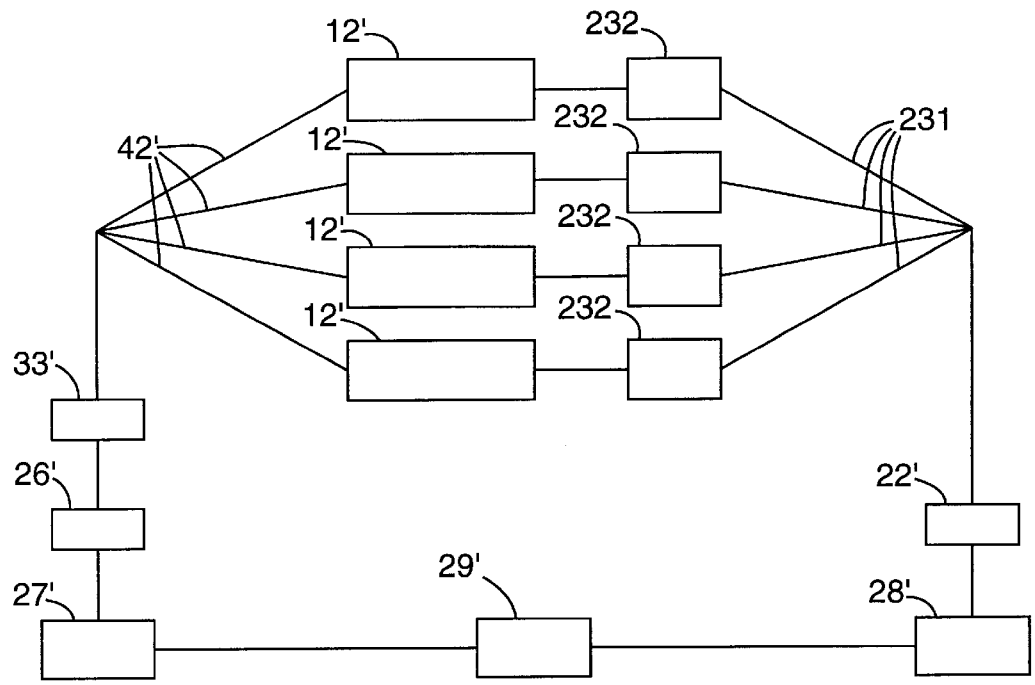
FIG. 32 is a simplified schematic of the laser of FIG. 30 showing multiple heat exchangers, one led to the fuel outlet of each gain module.

As shown in FIG. 31, a single heat exchanger 232 can be positoned between and coupled to both the fuel outlets 231 of the plurality of parallel gain modules 12', and the post cooler 22' for cooling the gaseous fuel discharged from the gain modules. Alternatively and as shown in FIG. 32, a plurality of heat exchangers 232 can be provided, one positioned adjacent to and in communication with each of the gain modules 12'.

Figure 33:
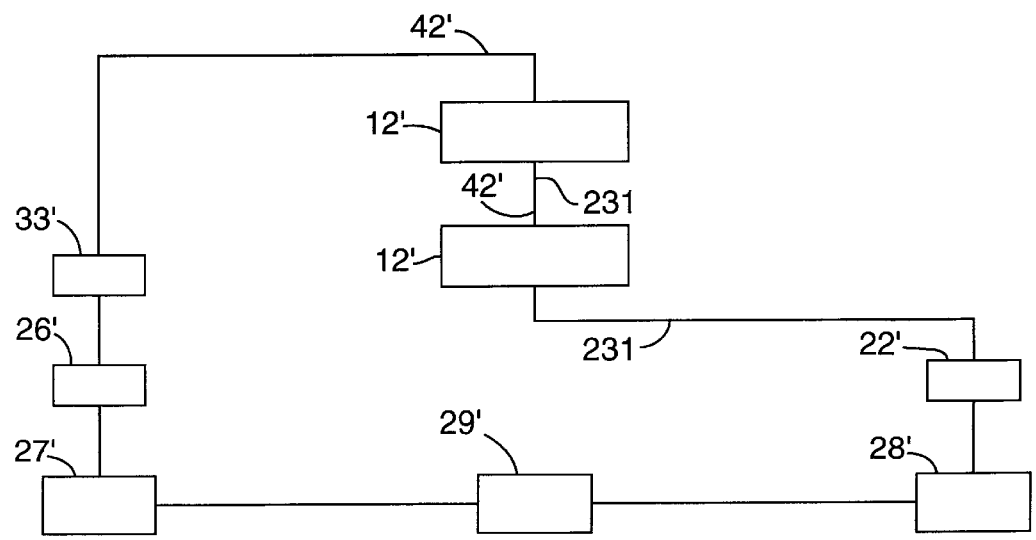
FIG. 33 is a simplified schematic of the laser of FIG. 1 showing multiple gain modules positioned in series relative to one another.

Referring to FIG. 33, the plurality of gain modules 12' can also be positioned in series relative to one another with the fuel outlets 231 of each gain module being in communication with the fuel inlets 42' of the next successive gain module. As illustrated schematically in FIG. 33, the fuel inlet 42' of the first gain module 12' in the series is in communication with the preheater 33' to receive gaseous fuel therefrom, and the fuel outlet 231 of the last gain module in the series is in communication with the post cooler 22' to expel the gaseous fuel thereto. While only two gain modules 12' positioned in series are illustrated, the present invention is not limited in this regard as any number of gain modules can be employed without departing from the broader aspects of the present invention.

Figure 34:
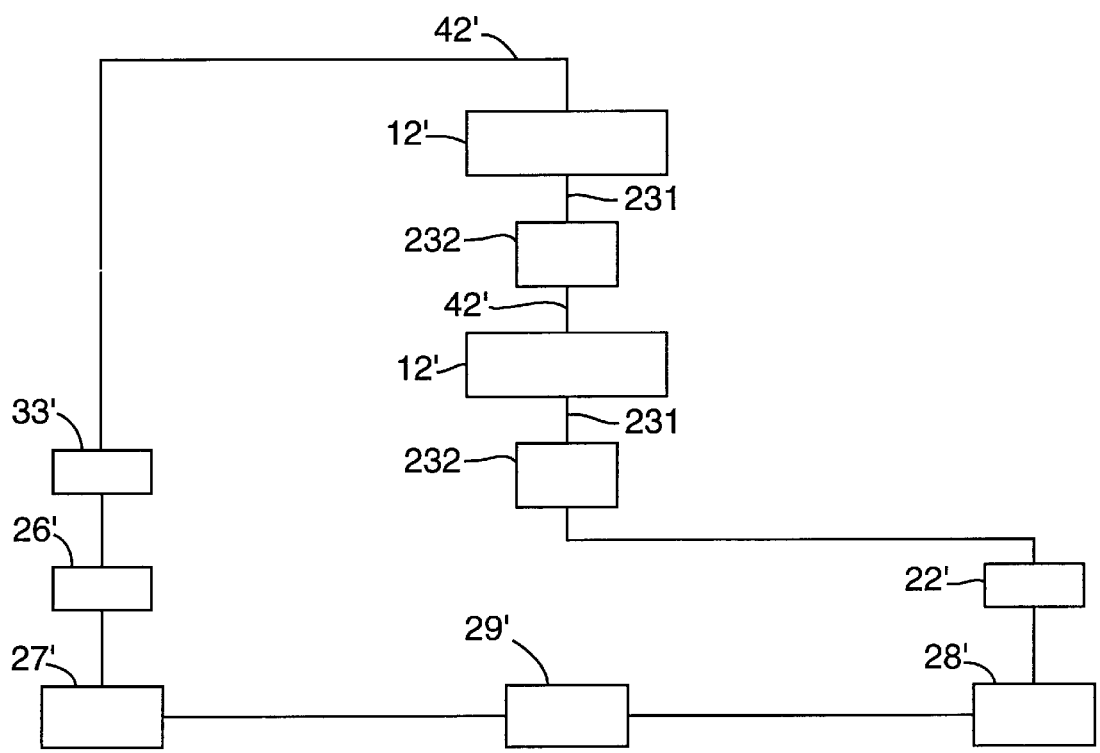
FIG. 34 is a simplified schematic of the laser of FIG. 33 showing multiple heat exchangers, on coupled to the fuel outlet of each gain module.

Turning to FIG. 34, a plurality of heat exchangers 232 can be positioned between and in communication with successive gain modules 12' in the series, with the last heat exchanger being positioned between and in communication with the last gain module in the series and the post cooler 22'. During operation, the heat exchangers 232 cool the gaseous fuel discharged from one gain module 12' prior to its entry into the next successive gain module.

Figure 35:
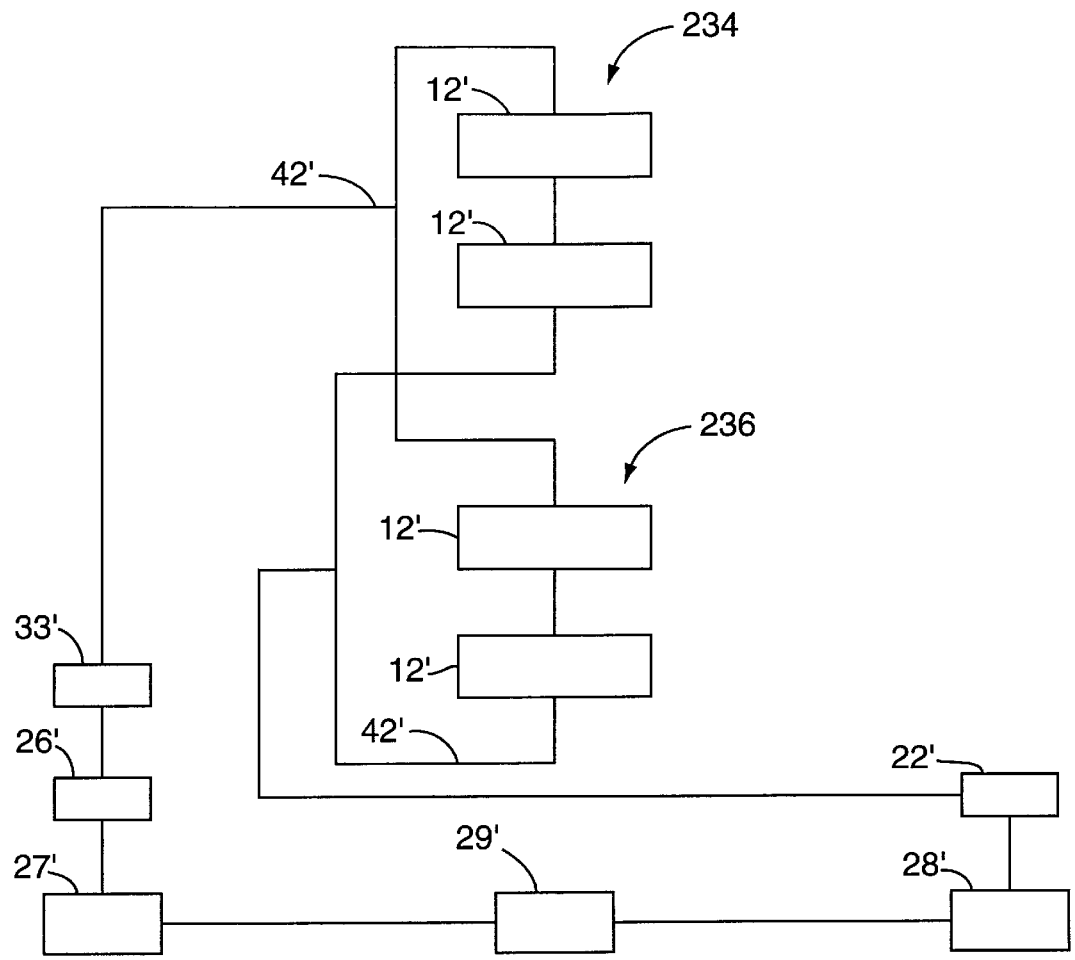
FIG. 35 is a simplified schematic of the laser of FIG. 1 showing multiple gain modules, portions of which are positioned in series relative to one another, with the portions being positioned in parallel relative to one another.

FIG. 35 illustrates a hybrid gain module configuration wherein a first portion 23' of the plurality of gain modules 12' are positioned in series relative to one another. Likewise, a second portion 236 of the plurality of gain modules 12' are also positioned in series relative to one another. The first and second portions, 236 and 238 respectively of the plurality of gain modules 12/are positioned in parallel relative to one another with the fuel inlet 42' of the first gain module in each portion being adapted to receive gaseous fuel from the evaporator 33', and the fuel outlets 231 in the last gain module in each of the portions discharging the gaseous fuel to the condenser 28'.

Still referring to FIG. 35, heat exchangers (not shown) can be positioned between successive gain modules 12' in each of the portions, for cooling the gaseous fuel exiting one gain module prior to its being presented to the fuel inlet 42' of the next successive gain module. The above-described serial configurations and hybrid configurations provide gain to PIL gain modules, but output power and efficiency are somewhat less than that achievable with the parallel configurations due to carry over of small amounts of molecular iodine formed during the iodine species excitation (I*) process using UV pumping radiation. The carried over molecular iodine reduces the gain in the downstream gain modules. However, there is still increased gain in such systems, resulting in high energies/high powers.

Figure 36:
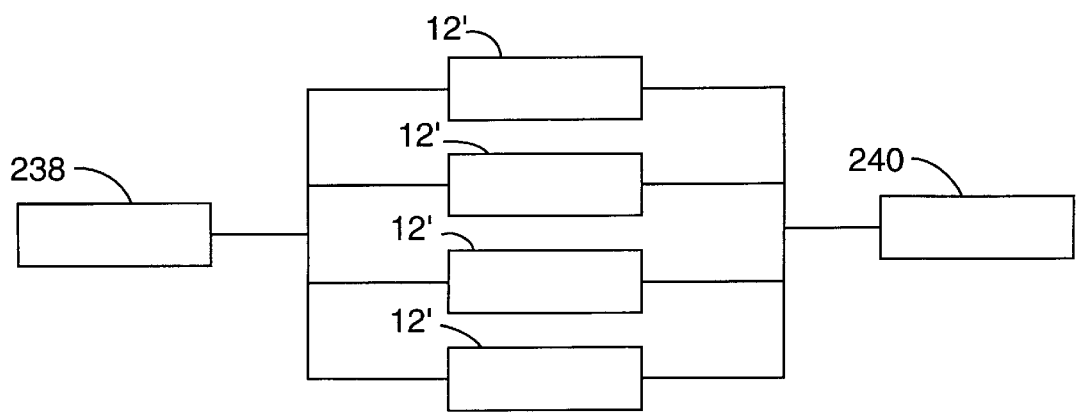
FIG. 36 is a partial schematic of the laser of FIG. 30 showing an oscillator for providing incident laser radiation to the gain modules, and a single beam combiner coupled to the gain modules for combining the individual laser beams output from each gain module into a single high power laser beam.

Multiple laser optics used in connection with multiple PIL gain modules described herein above, result in a single system for generating a high energy laser beam having excellent Beam Quality. As illustrated in FIG. 36, a suitable oscillator 238, such as, but not limited to a coupled resonator, a resonator, a diode laser, or other laser devices known to those skilled in the pertinent art, is coupled to a plurality of gain modules 12' mounted in parallel relative to one another, each gain module including laser optics (not shown). The oscillator 238 acts as an initial source laser and provides each gain module 12' with radiation, such that in conjunction with the associated laser optics, each gain module generates an independent laser beam. A beam combiner 240 is coupled to the plurality of gain modules for collecting and combining the independent laser beams into a single laser beam.

While four gain modules 12' have been illustrated, the present invention is not limited in this regard as any number of gain modules can be substituted without departing from the broader aspects of the present invention. For example, a high energy/high power system suitable for space debris removal in low earth orbit would need to generate a 45 kJ/pulse beam. Such a system would be configured in a manner similar to that illustrated in FIG. 36 with more numerous and larger, higher energy components. The Oscillator would be capable of generating 500–1000 J/pulse with eighteen (18) 4 m×60 cm×30 cm gain modules.

Figure 37:
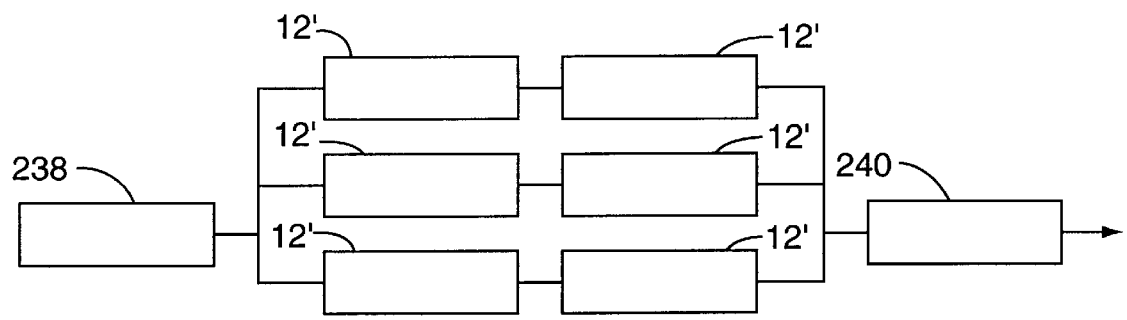
FIG. 37 is a partial schematic of the laser of FIG. 33 showing an oscillator for providing incident laser radiation to the first gain module in the series.
Figure 38:
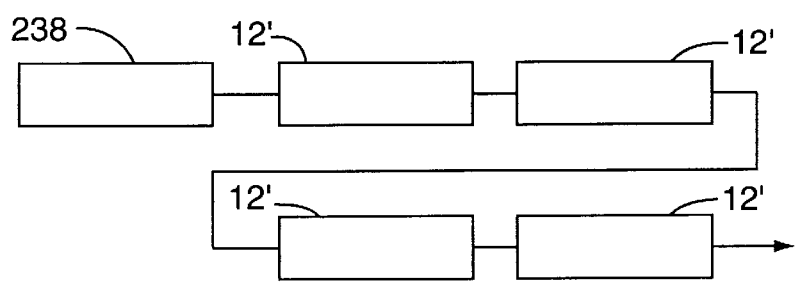
FIG. 38 is a partial schematic of the laser of FIG. 35 showing an oscillator for providing incident laser radiation to the gain modules, and a single beam combiner coupled to the gain modules for combining the individual laser beams output from each gain module into a single high power laser beam.

FIGS. 37 and 38, illustrated the series and hybrid gain module configurations as described above, and further including an oscillator for providing initial radiation to the modules.

While preferred embodiments have been shown and described, various modifications and substitutions may be made without departing from the spirit and scope of the present invention. Accordingly, it is to be understood that the present invention has been described by way of example and not by limitation.

What is claimed is:

1. A photolytic iodine laser comprising:
    a plurality of gain modules for exciting a gaseous fuel to higher energy levels by pumping incident radiation into an interior cavity defined by each gain module, each gain module including laser optics for providing a laser beam;
    a plurality of fuel inlets, one in gaseous communication with each of the interior cavities for receiving a supply of the gaseous fuel;
    a plurality of fuel outlets, one in communication with each of the interior cavities, opposite the associated fuel inlet;
    means for presenting the incident ultra-violet radiation to the interior cavity for exciting the gaseous fuel to higher energy levels;
    a closed-loop fuel system for presenting the gaseous fuel to the plurality of gain cells, the closed loop fuel system including:
        a condenser in communication with gain cell outlets for converting the gaseous fuel that has passed through each gain cell, into a liquefied fuel;
        a scrubber in communication with the condenser for removing any by-products, formed as a result of the lasing process, from the liquefied fuel to purify and prepare the fuel for recycling back to the plurality of gain cells;
        fuel pumping means interposed between the scrubber and the condenser for pumping the liquefied fuel; and
        an evaporator in communication with the scrubber for receiving and converting the liquefied fuel to a gaseous fuel.

2. A photolytic iodine laser as defined by claim 1, wherein the incident radiation is ultra-violet, and the means for presenting the incident radiation into the interior cavity includes at least one plasma lamp in communication with the interior cavity.

3. A photolytic iodine laser as defined by claim 1, wherein the incident radiation is ultra-violet, and the means for presenting incident radiation to the interior cavity includes a plurality of plasma lamps one in communication with the interior cavity defined by each of the gain modules.

4. A photolytic iodine laser as defined by claim 1, wherein the incident radiation is ultra-violet, and the means for presenting the incident radiation to the interior cavity includes at least one microwave subsystem in communication with the plurality of gain modules.

5. A photolytic iodine laser as defined by claim 1, wherein the incident radiation is ultra-violet, and the means for presenting incident radiation to the interior cavity includes a plurality of microwave subsystems, one in communication with each of the plurality of gain modules.

6. A photolytic iodine laser as defined by claim 1, wherein the incident radiation is ultra-violet, and the means for presenting incident radiation to the interior cavity includes at least one high energy diode in communication with the plurality of gain modules.

7. A photolytic iodine laser as defined by claim 1, wherein the incident radiation is ultra-violet, and the means for presenting incident radiation to the interior cavity includes a plurality of high energy diodes, one in communication with each of the plurality of gain modules.

8. A photolytic iodine laser as defined in claim 1, wherein the incident radiation is ultra-violet, and the means for presenting incident radiation to the interior cavity includes at least one plasma radiation source in communication with one plurality of gain modules, the plasma source being provided energy by Rf, microwave, electric discharge or other energy sources.

9. A photolytic iodine laser as defined in claim 1, wherein the laser's duty cycle can be varied by Q-switching.

10. A photolytic iodine laser as defined in claim 1, wherein the laser's duty cycle can be varied by modulation.

11. A photolytic iodine laser as defined in claim 1, wherein the laser's duty cycle can be varied by pulsing the laser's gain by presenting incident pulses of high energy ultra-violet incident radiation to the interior cavity from pulsed or modulated Rf sources.

12. A photolytic iodine laser as defined in claim 1, wherein the laser's duty cycle can be varied by microwave sources.

13. A photolytic iodine laser as defined in claim 1, wherein the laser's duty cycle can be varied by electric discharge sources.

14. A photolytic iodine laser as defined by claim 1, wherein the plurality of gain modules are each in gaseous communication with the evaporator, and are positioned in parallel relative to one another.

15. A photolytic iodine laser as defined by claim 14, further comprising at least one heat exchanger coupled to the fuel outlets of the plurality of gain modules for cooling the gaseous fuel prior to presenting it to the condenser.

16. A photolytic iodine laser as defined by claim 15, further comprising a plurality of heat exchangers one coupled to each of the fuel outlets of the plurality of gain modules for cooling the gaseous fuel prior to presenting it to the condenser.

17. A photolytic iodine laser as defined by claim 1 wherein:
    the plurality of gain modules are coupled to each other in series with the fuel outlet of one gain module being coupled to the fuel inlet of the next successive gain module; and
    the fuel inlet associated with a first gain module coupled in series with the remaining gain modules being in communication with the evaporator for receiving the gaseous fuel output from the evaporator.

18. A photolytic iodine laser as defined by claim 17, further comprising a plurality of heat exchangers, one positioned between each gain module and the next successive gain module for receiving and cooling gaseous fuel from the fuel outlet of each gain module prior to presenting the gaseous fuel to the next successive gain module.

19. A photolytic iodine laser as defined by claim 1, wherein:
    a first portion of said plurality of gain modules are coupled to each other in series with the fuel exit of one gain module being coupled to the fuel inlet of the next successive gain module;

the fuel inlet associated with a first gain module in the first portion being in communication with the evaporator for receiving the gaseous fuel output from the evaporator;

the fuel outlet of a last gain module in the first portion being in communication with the condenser;

a second portion of said plurality of gain modules are coupled to each other in series with the fuel exit of one gain module being coupled to the fuel inlet of the next successive gain module;

the fuel inlet associated with a first gain module in the second portion being in communication with the evaporator for receiving the gaseous fuel output from the evaporator; and the fuel outlet of a last gain module in the second portion being in communication with the condenser.

20. A photolytic iodine laser as defined by claim 1, further comprising:

a plurality of heat exchangers, one positioned between each gain module and the next successive gain module in the first and second portions for receiving and cooling gaseous fuel from the fuel outlet of each gain module prior to presenting the gaseous fuel to the next successive gain module;

one of the he at exchangers being positioned between the last gain module and the condenser in the first portion, and one of the heat exchangers being positioned between the last gain module and the condenser in the second portion for cooling the gaseous fuel from the gain modules prior to presenting the fuel to the condenser.

21. A photolytic iodine laser as defined by claim 1, further comprising:

a preheater in communication with and positioned between the evaporator and the gain modules for heating the gaseous fuel exiting the evaporator.

22. A photolytic iodine laser as defined by claim 1, further comprising:

a post cooler positioned between and in communication with the gain modules and the condenser, for cooling the gaseous fuel exiting the gain modules, prior to entry into the condenser.

23. A photolytic iodine laser as defined by claim 1 wherein the plurality of gain modules each include an amplifier for increasing the power of incident laser radiation pumped into the amplifier.

24. A photolytic iodine laser as defined by claim 1, wherein the plurality of gain modules each include a regenerative resonator for increasing the power of incident laser radiation pumped into the resonator.

25. A photolytic iodine laser as defined by claim 1, wherein the plurality of gain modules each include a coupled resonator for increasing the power of incident laser radiation pumped into the resonator.

26. A photolytic iodine laser as defined by claim 1, wherein the plurality of gain modules each include an injected resonator for increasing the power of incident laser radiation pumped into the resonator.

27. A photolytic iodine laser as defined by claim 1 wherein:

the means for presenting incident radiation to the interior cavity defined by each gain module is an initial source laser; and wherein the photolytic iodine laser further includes a beam combiner for receiving and combining the laser beams from each of the plurality of gain modules to produce a single high powered laser beam.

28. The laser ad defined by claim 1, wherein the gas flow to the plurality of laser gain modules is longitudiant; and wherein the gas is suppled by a single evaparator/ condenser gas flow system for the generation of higher energy/high power optical beams for commerical removal of space debris.

* * * * *

UNITED STATES PATENT AND TRADEMARK OFFICE
CERTIFICATE OF CORRECTION

PATENT NO. : 6,049,557
DATED : April 11, 2000
INVENTOR(S) : Cunningham et al.

It is certified that error appears in the above-identified patent and that said Letters Patent is hereby corrected as shown below:

Column 3,
Line 52, after "ground state", delete "(1)" and substitute -- (I) --.

Column 6,
Line 40, after "and the", delete "evaporate" and substitute -- evaporator --.
Line 53, after "FIG. 16 is", insert a --.

Column 7,
Line 23, after "one", delete "led" and substitute -- coupled --.
Line 29, after "exchangers," delete "on" and substitute -- one --.

Column 8,
Line 23, delete "$_m$= small signal gain" and substitute -- $\alpha_m$ = small signal gain --

Column 15,
Line 55, after "energy", insert -- at --.

Column 16,
Line 31, after "decrease", insert -- in --.

Column 19,
Line 15, after "were", delete "no" and substitute -- not --.

Column 23,
Line 38, after "above", insert -- by --.

Column 26,
Line 3, after "condenser", insert -- at --.

Column 27,
Line 2, after "change", delete "ar" and substitute -- and --.

Column 28,
Line 21, after "for 30", delete "an" and substitute -- and --.

UNITED STATES PATENT AND TRADEMARK OFFICE
CERTIFICATE OF CORRECTION

PATENT NO. : 6,049,557
DATED : April 11, 2000
INVENTOR(S) : Cunningham et al.

Page 2 of 2

It is certified that error appears in the above-identified patent and that said Letters Patent is hereby corrected as shown below:

<u>Column 29,</u>
Line 13, after "only", insert -- a --.

<u>Column 31,</u>
Line 34, after "models", insert -- . --.

<u>Column 33,</u>
Line 18, after "such as", delete "continues" and substitute -- continuous --.

<u>Column 36,</u>
Line 22, after "portion", delete 23'" and substitute -- 234 --.

<u>Column 39, claim 20,</u>
Line 26, after "of the", delete "he at" and substitute -- heat --.

Signed and Sealed this

Eighth Day of January, 2002

*Attest:*

*Attesting Officer*

JAMES E. ROGAN
*Director of the United States Patent and Trademark Office*